United States Patent
Klementiev

(10) Patent No.: US 7,627,821 B2
(45) Date of Patent: Dec. 1, 2009

(54) RECORDING/PLAYBACK TOOLS FOR UI-BASED APPLICATIONS

(75) Inventor: Dmitri A. Klementiev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 10/869,184

(22) Filed: Jun. 15, 2004

(65) Prior Publication Data

US 2005/0278728 A1 Dec. 15, 2005

(51) Int. Cl.
*G06F 3/00* (2006.01)

(52) U.S. Cl. ..................................................... 715/704

(58) Field of Classification Search ................... 715/704
See application file for complete search history.

(56) References Cited

U.S. PATENT DOCUMENTS

| | | | | |
|---|---|---|---|---|
| 5,333,302 | A * | 7/1994 | Hensley et al. | 714/37 |
| 5,335,342 | A * | 8/1994 | Pope et al. | 714/38 |
| 5,396,591 | A * | 3/1995 | Goss | 715/809 |
| 5,542,069 | A * | 7/1996 | Meppelink et al. | 703/17 |
| 5,781,720 | A * | 7/1998 | Parker et al. | 714/38 |
| 5,786,814 | A * | 7/1998 | Moran et al. | 715/720 |
| 6,046,741 | A * | 4/2000 | Hochmuth | 715/704 |
| 6,184,880 | B1 | 2/2001 | Okada | |
| 6,357,038 | B1 | 3/2002 | Scouten | |
| 6,535,912 | B1 * | 3/2003 | Anupam et al. | 709/217 |
| 6,549,216 | B1 * | 4/2003 | Schumacher et al. | 715/704 |
| 7,036,079 | B2 | 4/2006 | McGlinchey et al. | |
| 7,099,893 | B2 * | 8/2006 | Bischof et al. | 707/104.1 |
| 7,120,676 | B2 * | 10/2006 | Nelson et al. | 709/218 |
| 7,139,978 | B2 | 11/2006 | Rojewski et al. | |
| 7,275,240 | B2 | 9/2007 | Cole et al. | |
| 2001/0043234 | A1 | 11/2001 | Kotamarti | |
| 2002/0162053 | A1 * | 10/2002 | Os | 714/38 |
| 2003/0142122 | A1 * | 7/2003 | Straut et al. | 345/704 |
| 2003/0164850 | A1 | 9/2003 | Rojewski et al. | |
| 2004/0041827 | A1 * | 3/2004 | Bischof et al. | 345/704 |
| 2004/0070612 | A1 | 4/2004 | Sinclair et al. | |
| 2004/0221262 | A1 | 11/2004 | Hampapuram et al. | |
| 2004/0261026 | A1 * | 12/2004 | Corson | 715/704 |
| 2006/0010420 | A1 * | 1/2006 | Peterson et al. | 717/106 |
| 2006/0168467 | A1 | 7/2006 | Couturier et al. | |
| 2007/0106939 | A1 * | 5/2007 | Qassoudi | 715/704 |

OTHER PUBLICATIONS

Gerald Meszaros Agile Regression Testing Using Record & Playback OOPSLA 2003 Oct. 26-30, 2003.*

(Continued)

*Primary Examiner*—William L Bashore
*Assistant Examiner*—Andrea N Long
(74) *Attorney, Agent, or Firm*—Klarquist Sparkman, LLP.

(57) ABSTRACT

Techniques and tools are described for recording input from user actions in a user interface (UI) and replicating the UI activity on a computing device. When recording and replicating UI activity, these techniques and tools improve the readability of the recorded input data and the reliability of playback. The techniques and tools may be used in combination or separately. For example, a recording tool uses a set of filters, which aggregates recorded data into basic, readable primitive methods. The recording tool converts the aggregated data into playback code by converting the playback primitive methods into corresponding computer language instructions. A playback tool may then replicate the initial recorded UI activity by playing back the computer language instructions.

28 Claims, 15 Drawing Sheets

OTHER PUBLICATIONS

Scott Hudson, Bonnie John, Keith Knudsen, and Michael Byrne A Tool for Creating Predictive Performance Models from User Interface Demonstrations UIST '99.*

Tool Mentor: Creating Test Scripts Using Rational Robot Copyright 1987-2000.*

Jessica Chen "Expressing Graphical User's Input for Test Specifications" EDCIS 2002, LNCS 2480, pp. 347-359, 2002. Springer-Verlag Berlin Heidelberg 2002.*

Mark Molander "Reducing the user interface" Jun. 1, 2001.*

"Programming Model for WinFx: Common Programming Techniques: Accessibility," 3 pages, downloaded from the World Wide Web on Mar. 4, 2004.

"Programming Model for WinFx: Common Programming Techniques: Accessibility: Introduction to User Interface Automation," 3 pages downloaded from the World Wide Web on Mar. 4, 2004.

"Programming Model for WinFx: Common Programming Techniques: Accessibility: About the User Interface Automation Tree," 2 pages, downloaded from the World Wide Web on Mar. 4, 2004.

"Programming Model for WinFx: Common Programming Techniques: Accessibility: About User Interface Automation Events," 2 pages, downloaded from the World Wide Web on Mar. 4, 2004.

"Programming Model for WinFx: Common Programming Techniques: Accessibility: About User Interface Automation Input," 2 pages, downloaded from the World Wide Web on Mar. 4, 2004.

"Programming Model for WinFx: Common Programming Techniques: Accessibility: About User Interface Automation Security," 2 pages, downloaded from the World Wide Web on Mar. 4, 2004.

"Programming Model for WinFx: Common Programming Techniques: Accessibility: About User Interface Automation Control Patterns," 3 pages, downloaded from the World Wide Web on Mar. 9, 2004.

"Programming Model for WinFx: Common Programming Techniques: Accessibility: About User Interface Automation Properties," 1 page, downloaded from the World Wide Web on Mar. 9, 2004.

"Programming Model for WinFx: Common Programming Techniques: Accessibility: About User Interface Automation Support for the Combo Box Control," 3 pages, downloaded from the World Wide Web on Mar. 9, 2004.

"Programming Model for WinFx: Common Programming Techniques: Accessibility: About User Interface Automation Support for the ListBox Control," 2 pages, downloaded from the World Wide Web on Mar. 9, 2004.

"Programming Model for WinFx: Common Programming Techniques: Accessibility: About User Interface Automation Support for the Menu Control," 4 pages, downloaded from the World Wide Web on Mar. 9, 2004.

"Programming Model for WinFx: Common Programming Techniques: Accessibility: Control Patern Mapping for User Interface Automation Clients," 2 pages, downloaded from the World Wide Web on Mar. 9, 2004.

"Programming Model for WinFx: Common Programming Techniques: Accessibility: Control Pattern Mapping for User Interface Automation Providers," 6 pages, downloaded from the World Wide Web on Mar. 9, 2004.

"Programming Model for WinFx: Common Programming Techniques: Accessibility: Implementing Control Patterns on 'Avalon' Platform Elements," 2 pages, downloaded from the World Wide Web on Mar. 9, 2004.

"Programming Model for WinFx: Common Programming Techniques: Accessibility: Implementing the Invoke Control Pattern," 2 pages, downloaded from the World Wide Web on Mar. 9, 2004.

"Programming Model for WinFx: Common Programming Techniques: Accessibility: Introduction to UI Spy," 1 page, downloaded from the World Wide Web on Mar. 9, 2004.

"Programming Model for WinFx: Common Programming Techniques: Accessibility: Using User Interface Automation for Clients," 4 pages, downloaded from the World Wide Web on Mar. 9, 2004.

"UI Terminology," 5 pages, downloaded from the World Wide Web on Jun. 15, 2004.

"MacroExpress®: The Windows Automation Tool," 2 pages, downloaded from the World Wide Web on Jun. 11, 2004.

"MacroExpress®: PGM Functions Library," 1 page, downloaded from the World Wide Web on Jun. 11, 2004.

"AIM Keys: The All-in-one Macro Utility," *AIMSOFT*, 2 pages, downloaded from the World Wide Web on Jun. 11, 2004.

"RapidKey—Autotext and Macros for Windows 9x, ME, NT, 2000, XP," 2 pages, downloaded from the World Wide Web on Jun. 11, 2004.

"Tech Web: TechEncyclopedia," 2 pages, downloaded from the World Wide Web on Jun. 11, 2004.

"Aldo's Macro Recorder 4.1," 6 pages, downloaded from the World Wide Web on Jun. 11, 2004.

"WinTask," 3 pages, downloaded from the World Wide Web on Jun. 11, 2004.

"Automate and Monitor IT Systems," 1 page, Unisyn Software, downloaded from the World Wide Web on Jun. 11, 2004.

"Automate Architecture," Unisyn Software, 2 pages, downloaded from the World Wide Web on Jun. 11, 2004.

"Macro Scheduler," MJNET, 3 pages, downloaded from the World Wide Web on Jun. 11, 2004.

"Graphical User Interface," FOLDOC, 1 page, downloaded from the World Wide Web on Apr. 24, 2004.

Microsoft Corporation, "Microsoft Windows for Workgroups User's Guide," p. 137 (1985).

"Programming Model for WinFx: Common Programming Techniques: Accessibility: Implementing the Selection Control Pattern," 1 page, downloaded from the World Wide Web on Mar. 9, 2004.

"Programming Model for WinFx: Common Programming Techniques: Accessibility: Implementing the Value Pattern," 1 page, downloaded from the World Wide Web on Mar. 9, 2004.

"Aldo's Macro Recorder 4.1," 5 pp. (downloaded from the World Wide Web on Oct. 31, 2006; document marked Nov. 7, 2003).

"Macro Express Home Page," 2 pp. (downloaded from the World Wide Web on May 17, 2006).

"JitBit Macro Recorder 3.6," 2 pp. (downloaded from the World Wide Web on Oct. 31, 2006).

"PGM Functions," 5 pp. (downloaded from the World Wide Web on May 17, 2006).

* cited by examiner

```
/// </summary>
/// <param name="relativeCoordinates">Coordinates of this element to be visible, relative to left-upper corner of
/// this element</param>
/// <returns>true if this function was successful and false otherwise</returns>
public bool EnsureVisible(Point relativeCoordinates)

/// <summary>
/// LeftButtonClick on screen element
/// </summary>
/// <param name="relativeCoordinates">Relative coordinates</param>
public void LeftButtonClick(Point relativeCoordinates)

/// <summary>
/// RightButtonClick on screen element
/// </summary>
/// <param name="relativeCoordinates">Relative coordinates</param>
public void RightButtonClick(Point relativeCoordinates)

/// <summary>
/// DoubleClick
/// </summary>
/// <param name="relativeCoordinates">Relative coordinates</param>
public void DoubleClick(Point relativeCoordinates)

/// <summary>
/// Select screen element
/// </summary>
public void Select()

/// <summary>
/// SetValueAsComboBox for screen element
/// </summary>
/// <param name="newValue"></param>
public void SetValueAsComboBox(string newValue)

/// <summary>
/// SetValueAsEditBox for screen element
/// </summary>
/// <param name="newValue"></param>
public void SetValueAsEditBox(string newValue)

/// <summary>
/// Check screen element
/// </summary>
public void Check()
``` continued in Figure 4B

Figure 4B

```
/// <summary>
/// Uncheck screen element
/// </summary>
public void Uncheck()

/// <summary>
/// Expand screen element
/// </summary>
public void Expand()

/// <summary>
/// Collapse screen element
/// </summary>
public void Collapse()

/// <summary>
/// SendKeys to screen element
/// </summary>
/// <param name="keys"></param>
public void SendKeys(string keys)

/// <summary>
/// StartDragging screen element
/// </summary>
/// <param name="relativeCoordinates"></param>
public void StartDragging(Point relativeCoordinates)

/// <summary>
/// StopDragging screen element
/// </summary>
/// <param name="relativeCoordinates"></param>
public void StopDragging(Point relativeCoordinates)

/// <summary>
/// Retrieves the information about a UI element
/// </summary>
/// <returns>Information about a UI element</returns>
public VerificationInfo GetInformation();

/// <summary>
/// Verifies that a UI element matches the information that is expected
/// </summary>
/// <param name ="info">information that is expected</param>
public void Verify(VerificationInfo info);
```

Figure 5

1. EnsureVisible(ContainerID Container, UIelementID UIelement, Point RelativeCoordinates)
2. LeftClickOnUIElement(ContainerID Container, UIelementID UIelement)
3. RightClickOnUIElement(ContainerID Container, UIelementID UIelement)
4. DoubleClickOnUIElement(ContainerID Container, UIelementID UIelement)
5. SelectItemInUIElement(ContainerID Container, UIelementID Container, UIelementID[] UIelement)
6. SetComboBoxString(ContainerID Container, UIelementID UIelement, String string)
7. SetEditBoxString(ContainerID Container, UIelementID UIelement, String string)
8. SetCheckBox(ContainerID Container, UIelementID UIelement, Boolean Check)
9. ExpandItemInUIElement(ContainerID Container, UIelementID UIelement)
10. CollapseItemInUIElement(ContainerID Container, UIelementID UIelement)
11. SendKeys(String string)
12. VerifyUIElement(ContainerID Container, UIelementID UIelement, UIelementVerificationInfo info)
13. GetUIElementInfo(ContainerID Window, UIelementID UIelement, UIelementVerificationInfo info)
14. DragAndDrop(UIelementID Container, Point RelativeCoordinates, UIelementID UIelement, UIelementID Newontainer, Point RelativeCoordinates)

Figure 6A

```
// Set playback options
ScreenElement screenElement;
ScreenElement.RetrieveElementTimeOut = 3000;
ScreenElement.Highlight = false;
```
                                                                                610

```
// Left Button Click on "Button" named "Start" in window ""
screenElement =
ScreenElement.FromPersistentId("PID1.0:M6578706C6F7265722E657865,C5368656C6C5F54726179576E64:I3
33034,C427574746F6E:");
screenElement.LeftButtonClick(new Point(25 , 5));
```

```
// Left Button Click on "ListView Item" named "Run..." in window "Start Menu"
AndCondition propertyCondition = new AndCondition(new PropertyCondition(LogicalElement.NameProperty,
"Run..."), new PropertyCondition(LogicalElement.LocalizedControlTypeProperty, "ListView Item"));
screenElement = ScreenElement.FetchScreenElement(propertyCondition);
screenElement.LeftButtonClick(new Point(66 , 13));

// SendKeys "notepad" to "Combo Box" named "Open:" in window "Run"
screenElement =
ScreenElement.FromPersistentId("PID1.0:M7368656C6C33322E646C6C,C233332373730:I3132323938,C436F6
D626F426F78:");
screenElement.SendKeys("notepad");

// Left Button Click on "Button" named "OK" in window "Run"
screenElement =
ScreenElement.FromPersistentId("PID1.0:M7368656C6C33322E646C6C,C233332373730:I31,C427574746F6E:
");
screenElement.LeftButtonClick(new Point(50 , 11));

// Left Button Click on "Menu Item" named "Format" in window "Untitled - Notepad"
screenElement =
ScreenElement.FromPersistentId("PID1.0:M6E6F74657061642E657865,C4E6F7465706164:I31:I32:");
screenElement.LeftButtonClick(new Point(26 , 13));
``` continued in Figure 6B

Figure 6B

```
// Left Button Click on "Menu Item" named "Font..." in window "Menu"
screenElement =
ScreenElement.FromPersistentId("PID1.0:M6E6F74657061642E657865,C4E6F7465706164:I31:I32:C233332373
638:I31:");
screenElement.LeftButtonClick(new Point(31 , 4));

// Left Button Click on "ListBox Item" named "Lucida Console" in window "Font"
propertyCondition = new AndCondition(new PropertyCondition(LogicalElement.NameProperty, "Lucida
Console"), new PropertyCondition(LogicalElement.LocalizedControlTypeProperty, "ListBox Item"));
screenElement = ScreenElement.FetchScreenElement(propertyCondition);
screenElement.LeftButtonClick(new Point(81 , 7));

// Left Button Click on "ListBox Item" named "Bold Italic" in window "Font"
propertyCondition = new AndCondition(new PropertyCondition(LogicalElement.NameProperty, "Bold Italic"),
new PropertyCondition(LogicalElement.LocalizedControlTypeProperty, "ListBox Item"));
screenElement = ScreenElement.FetchScreenElement(propertyCondition);
screenElement.LeftButtonClick(new Point(22 , 4));

// Select Item on "ListBox Item" named "48" in window "Font"
propertyCondition = new AndCondition(new PropertyCondition(LogicalElement.NameProperty, "48"), new
PropertyCondition(LogicalElement.LocalizedControlTypeProperty, "ListBox Item"));
screenElement = ScreenElement.FetchScreenElement(propertyCondition);
screenElement.Select();

// SetComboBoxValue "Cyrillic" on "Combo Box" named "Script:" in window "Font"
propertyCondition = new AndCondition(new PropertyCondition(LogicalElement.NameProperty, "Script:"), new
PropertyCondition(LogicalElement.LocalizedControlTypeProperty, "Combo Box"), new
PropertyCondition(LogicalElement.ClassNameProperty, "ComboBox"));
screenElement = ScreenElement.FetchScreenElement(propertyCondition);
screenElement.SetValueAsComboBox("Cyrillic");

// Left Button Click on "Button" named "OK" in window "Font"
screenElement =
ScreenElement.FromPersistentId("PID1.0:M6E6F74657061642E657865,C4E6F7465706164:C233332373730:I31
,C427574746F6E:");
screenElement.LeftButtonClick(new Point(32 , 14));
```

Software 1280 for UI recording and playback

RECORDING/PLAYBACK TOOLS FOR UI-BASED APPLICATIONS

TECHNICAL FIELD

Tools and techniques are described for recording user activity within graphical user interfaces. For example, a tool formats and filters recorded steps performed against a computer application that supports graphical user interface in a meaningful way for readability and playback.

BACKGROUND

I. Graphical User Interface (GUI)

On many modern computer systems, users interact with software programs through a graphical user interface (GUI). Basically, a GUI is an interface between computer and user that uses pictures rather than just words to solicit user input and present the output of a program. The typical GUI is made up of user interface elements (UI elements), which are those aspects of a computer system or program that are seen, heard, or otherwise perceived or interacted with by a user. For example, UI elements include items such as icons, pushbuttons, radio buttons, dialog boxes, edit boxes, list boxes, combo boxes, scroll bars, pick lists, and various components of World Wide Web pages (e.g., hyper-links and images). In a typical computer program it is common to encounter literally thousands of UI elements.

Although an individual element of a GUI may appear to the user as a single item, it may actually consist of a number of separate items or sub-elements that have been combined together. For example, a toolbar item may consist of a list element, a combo box element, a scroll bar element, etc. Furthermore, each of these sub-elements themselves may be composed from other sub-elements. In this manner, UI elements can serve as building blocks for building other, more complex, UI elements. Such an approach is useful because the software managing the user interface can re-use the definitions of certain common elements when assembling them into composite elements.

Many UI elements in a GUI environment represent features of a program and are displayed on the computer screen so users can interact with the program by selecting, highlighting, accessing, and operating them. This user interaction is done by maneuvering a pointer on the screen (typically controlled by a mouse or keyboard) and pressing or clicking buttons while the pointer is pointing to a UI element. For example, in a word processor, a user can maneuver the mouse to select an item on the program's menu bar, to click an icon from the tool bar, or to highlight blocks of text in the viewer window. Similarly, a user can use keyboard input to interact with a computer application. For instance, in the word processing program, a user can press "ALT-F," "CTRL-B," or other pre-defined keystroke combinations to access program features. Based on the input from the mouse or keyboard, the computer adds, changes, and manipulates what is displayed on the screen. GUI technologies provide convenient, user-friendly environments for users to interact with computer systems.

II. UI Automation

UI Automation (UIA) is an accessibility framework for Microsoft Windows intended to address the needs of assistive technology products and automated test frameworks by providing programmatic access to information about the user interface (UI). For example, UIA allows a screen reader program to access information about the user interface of a word processor, which gives the reader program the information it needs to provide audible cues to a visually impaired user. Through an application programming interface (API) set of methods, UIA provides a well-structured mechanism for creating and interacting with a UI. Control and application developers use the UIA API set to make their products more accessible to different users through existing or new software (potentially written by other people) to access program menus and other UI elements. For example, braille screens, screen readers, narrators, and other software in Microsoft Windows can use UIA to facilitate computer use for users who otherwise may not have access.

In practice, UI Automation uses a hierarchy of UI elements located in a tree structure to provide reliable UI information to the operating system and computer applications. FIG. 1 illustrates one such tree structure representation 100 of a typical GUI on a computer. More particularly, FIG. 1 illustrates how elements of a GUI can be shown as nested within each other in order to accurately describe their organization. At the very top of the tree structure 100 is a desktop element 101 that is representative of the GUI's "desktop" or default background area. The desktop element 101 has within it several application elements (e.g., 105A, 105B and 105C) for application programs that have been invoked and are ready to execute according to a user's instructions (e.g., a typical Microsoft Windows desktop may have several instances of applications such as Microsoft Word, Microsoft Excel, etc. loaded and ready to execute). At a lower level in the tree structure hierarchy are several frames (e.g., 110A, 110B and 110C) associated with an application 105B (e.g., a word processor application may have several frames visible to a user at any given time). Within each of the frames (e.g., 110B) may be several documents (e.g., 115A and 115B), each document containing within it several UI elements. Document B 115B contains controls 120A, 120B and 120C (buttons, listboxes, etc.). UI elements (e.g., 120A, 120B and 120C) may themselves be composites of other UI elements. For example, the element 120B (such as a dialog box, or a combo box) in turn may contain other UI elements such as a button control at 125. Furthermore, the button element 125 itself may contain other UI elements such as control 130. Such nesting can be arbitrarily deeper and include an arbitrary number of branches depending on the user interface and its component elements.

For some operating system platforms, an instance of a UI element is assigned an identifier to help distinguish that particular UI element from other UI elements. For example, in a Microsoft Windows based operating system, applications are associated with module identifiers that identify applications within a given desktop context. Also, some user interface platforms (e.g., Microsoft Windows, Swing for Java) use a numeric identifier (control ID) for certain UI elements. In some computing environments, such as a Microsoft Windows environment, UI elements are often associated with a class name associated with the control class to which they belong. For instance, in a Microsoft Windows based system, common UI elements such as combo box, list box, and button are associated with class names such as ComboBox class, ListBox class, and Button class, respectively. Similarly, other UI frameworks may have names for their respective classes of UI elements.

Notably, these techniques identify a UI element's object class or type, but do not singularly provide a strong identifier that uniquely identifies a UI element across a reboot of the computer running the program, across a different build of the program when still in development, across the opening of an another instance of the same program, or for opening of the same program on another computer.

UIA overcomes these deficiencies by generating a composite ID that uniquely identifies a UI element in a GUI tree. UIA generates the composite identifier by adding identification information (e.g., control name or control type) that is directly associated with an UI element to hierarchical identification information (e.g., parent control, child control, and/or sibling controls) and control pattern-specific information (e.g., depth of the UI element in the tree). For example, in FIG. 1, an identifier for target UI element 130 may be generated by collecting identifying information related to parent UI elements (e.g., 101, 105B, 110B, 115B, 120B, and 125) that describe the hierarchical arrangement between a target leaf UI element (130) and the root element at desktop 101. Through the concept of a path, the related identifiers for a UI element's unique hierarchy and parentage can be leveraged to identify it uniquely and persistently.

The unique identifier (persistent ID) provides easy access to individual UI elements so that the functionality of a program hosting UI elements can be programmed and tested, and so that a particular UI element can be identified to other program modules.

For additional information about UIA, see, for example, the documentation available through the Microsoft Developer Network.

III. UI Recording and Playback

The ability to record and playback a user's interaction with computer applications in a GUI environment has the potential to benefit multiple parties, including users, software developers, and computer support personnel. For example, users benefit by creating macros or scripts that combine a series of inputted actions into a single step playback action. Software developers can potentially use the ability to record user actions to help generate test cases for software under development. Computer support personnel can record user actions to discover the reason for computer crashes or hangs, or to help users understand how to use software. Conventional UI recorders, such as a macro recorder, have attempted to provide some of these benefits to users. However, current recording tools have drawbacks that limit their usefulness.

A main drawback to many conventional macro programs (which are different from a UI recorder that actually records user actions) is that the scripts they generate do not represent an actual step-by-step readable recording of UI activity (e.g., user actions against a UI-based application). Furthermore, these generated scripts often miss some important input steps such as the expansion of selected pop-up menus. The generated scripts show the internal commands and actions taken by the operating system or application to perform a certain function, but they do not show in a meaningful way actions actually performed by the user. Moreover, in many instances, users must independently develop scripts based on a set of scripting commands and complex programming constructs. Thus users have to understand programming logic and, to some extent, the underlying logic of the programs being controlled to create and use a macro. For example, AutoMate, a macro program, uses a drag-and-drop task builder to create a script by dragging and dropping specific steps into the order they should be executed. As another example, consider Macro Scheduler; it is a macro creation program that allows a user to write a macro script using its more than 200 script commands and programming constructs (not including actual declared variables and other user-defined structures). The complexity required to create and edit the scripts generated by these macro programs and the fact that they do not show actual user input lessens those macro programs' usefulness, particularly to novice users and to computer support personnel and software developers attempting to troubleshoot problems.

Other macro creating programs, such as Borland's Superkey, let users create keyboard macros, rearrange the keyboard, and encrypt data and programs. However, they focus just on keyboard input, rather than recording user activity and representing it in a meaningful way.

Many conventional UI recorders have similar drawbacks to those described above, in that they use complex scripting commands and programming constructs to represent data. On the other hand, one drawback to conventional UI recorders that attempt to record actual UI activity is that they record extraneous data that makes output hard to read. Basically, conventional recording tools record everything that happens on the computer, including activity that is irrelevant to the particular task that is the subject of the recording. For example, this irrelevant activity may include Windows messages, unrelated API calls, and extraneous mouse movements. Recording all this extra data floods the recording pipe with actions and messages that are unnecessary for playback and, ultimately, makes the recorder output difficult to read and understand.

Another drawback to conventional recorders relates to problems with the context for playback of recorded data, and these problems are exacerbated by the presence of irrelevant data as described above. A conventional playback component simply plays back the recorded data exactly as the data were recorded. This makes playback inefficient and, in many case, causes playback to simply fail. Part of the reason for failure is that conventional playback is very dependent on the recording computer's pre-existing conditions. For example, playback may depend on a certain hardware configuration, software installation, and/or the dynamic state of the runtime environment (such as the availability or location of a UI element for a particular recorded interaction). Using a conventional playback tool, any changes to those pre-existing conditions may cause playback to fail. For instance, suppose a user records UI activity at a low monitor/desktop resolution. Later, the user changes to a higher monitor/desktop resolution. In this case, playback would most likely fail because the screen position of all the UI elements has changed. Similarly, playback may fail because a call to an unrelated API was recorded and on playback the API does not exist. Hence, as the computer environment changes more, or as larger volumes of irrelevant data are recorded, playback becomes increasingly unreliable.

As another example, suppose user actions are recorded for the following simple activities: the user mouse-clicks a drop down button of a combo box to show a list box with names of states, scrolls through the list box to by moving the thumb wheel of a mouse, and mouse-clicks on an item such as the state "Washington." When the steps are played back exactly as they were recorded, there may not be the same number of items in the list box, so moving the thumb wheel the same way as recorded may result in selection of a different item. The recorded wheel movement may not even make the item that needs to be selected visible. Or, the item may not even exist in the list box (e.g., if the combo box has an edit control). Finally, if filling the list box takes time, then a synchronization problem may arise. Recording conditions are critical to reliable playback and any changes in those conditions can cause playback to fail.

As noted above, conventional UI recorders frequently do not support synchronization mechanisms, which, depending on the workload of the computer being recorded, the workload of the playback computer, as well as other factors, can cause playback to fail. For example, a user records the necessary steps to launch an application. On playback, the tool automatically tries to run each recorded instruction within a certain amount of time based on the recorded timeframe. If a step fails to finish within the predetermined timeframe, it can cause an entire chain of steps to fail when subsequent steps rely on predecessor steps.

For instance, in a Microsoft Windows 3.1 environment, suppose a recording tool records the series of steps necessary to launch a word processor and open a file in it. On subsequent playback, if the application takes longer than expected to launch, a conventional playback tool would try to open a file before the application is ready, and playback would fail. For additional information about macro recording in Microsoft Windows 3.1, see, for example, the reference entitled, User's Guide for Microsoft Windows for Workgroups, at page 137.

In conclusion, these prior recording and playback systems provide unreliable techniques for recording and playing back user actions on a computer. Thus, there is a need in the art for tools that record user actions performed against UI-based applications and selectively filter and adjust data to provide more reliable playback. There is also a need in the art for tools that provide more readable output so recorded data can be read, interpreted, and edited according to user needs. Further, there is a need in the art for tools that address the synchronization problems of past recording technologies. These and other advantages may be achieved by the tools and techniques described herein.

SUMMARY

Techniques and tools are presented herein for recording and reliably replicating user interface (UI) activity. In various common situations involving UI activity, these techniques and tools dramatically improve the user's ability to interpret and modify recorded UI input, and dramatically improve the reliability of playback to replicate the user activity. For example, the tools and techniques improve the ability to read and playback UI activity through the use of filters and playback primitives.

According to a first aspect, a tool records input data describing user activity in a GUI. For example, the tool receives raw input data from input devices and aggregates the recorded data into meaningful data using filters. Based on the filtered data, the tool may generate playback code to replicate the recorded UI activity. Using this tool and its techniques improves the reliability of playback code by filtering irrelevant data.

According to a second aspect, a tool filters recorded input data into playback primitives. Primitives represent basic actions performed by a user in a graphical user interface that are meaningful for UI recording and/or playback. For example, the tool filters data from input devices into primitives that are readable and meaningful. The tool uses the primitives to generate readable playback code, which may be edited to enhance playback and then saved.

According to a third aspect, a tool replicates user activity by processing playback code. For example, the tool receives a series of programming instructions that correspond to playback primitives, then processes the programming instructions to play back user actions. This allows the tool to drive a UI-based application.

Additional features and advantages of the invention will be made apparent from the following detailed description of implementations that proceeds with reference to the accompanying drawings.

BRIEF DESCRIPTION OF THE DRAWINGS

FIGS. 4A-B are one listing of primitives for defining recorded UI activity.

FIG. 5 is a listing of alternative primitives for defining recorded UI activity.

FIGS. 6A-B are an example listing of generated playback code based on primitive methods.

DETAILED DESCRIPTION

Figure 1:
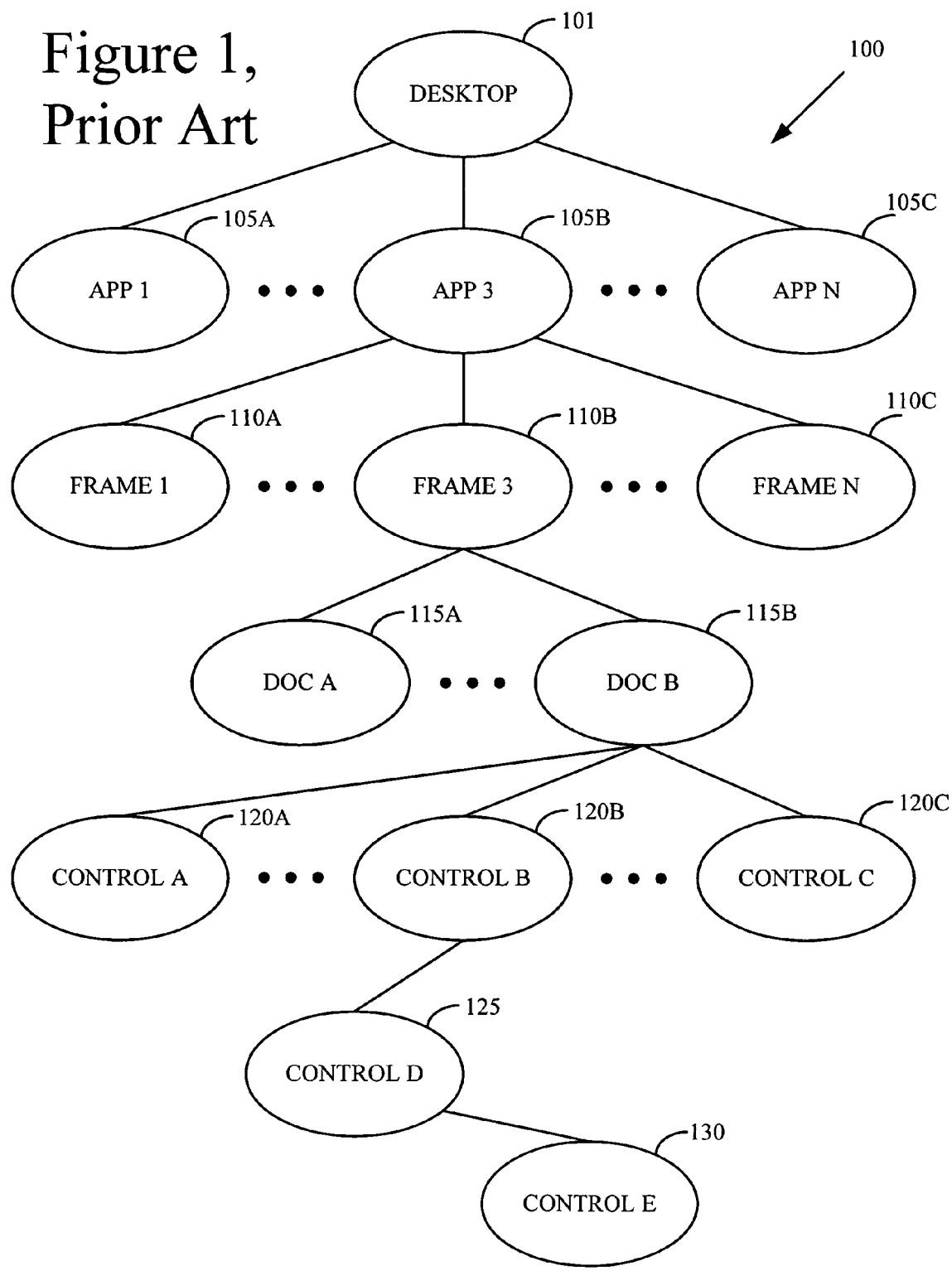
FIG. 1 is a block diagram of a tree representing the structure of a graphical user interface according to the prior art.

The following description is directed to techniques and tools for recording and playing back user interaction with a computer. For example, a tool records the steps a user performs when interacting with a UI-based application, represents these steps in a meaningful, human-readable way, and generates code that reflects the steps, where the code may subsequently be played back to recreate the user interaction. In various common situations, these techniques and tools dramatically improve the readability of UI playback code and the reliability of UI recording and playback. The various techniques and tools may be used in combination or separately.

Recording the raw steps (e.g., mouse clicks, keystrokes) that a user performs interacting with a UI-based application is relatively simple; the challenges are in how to represent and process this information in ways that facilitate human review and improve the reliability and robustness of playback. Conceptually, some techniques and tools improve UI recording and playback performance by providing users with an abstract, user-friendly interface through which they may read UI input and convert the UI input into playback code. The raw steps are filtered using filtering techniques and basing the output on a foundational set of limited number of playback primitive methods. A primitive can be a function, an object method, a routine, or other mechanism that is called, and in a particular context may take the form of computer language instruction(s), a definition, a descriptive term, a link, a command, a macro call, a macro routine, or any other similar expression. The filters (or aggregators) that convert raw steps into meaningful output can be defined and adjusted by a user.

The techniques and tools create human-readable output that defines user interaction with a computer. Once the user interactions have been recorded, those actions may be converted into programming code for playback on the same or different computer. The graphical nature and readability of the outputted code generated by these tools and techniques also means new code may be changed, deleted, and/or added as needed. The components that constitute the recording part of the tool such as collectors, aggregator, and code generator are pluggable and can be replaced by a user.

These techniques and tools make UI recording and playback reliable, since meaningful data is recorded and displayed. Moreover, the tools and techniques provide users with an interface for smooth, reliable playback. The techniques and tools can be implemented in various ways.

The UI recording and playback techniques and tools may be used for various purposes. Technical support is one field of use. For example, suppose a user has encountered a problem using software. With a UI recording and playback tool as described herein, the user records the steps he has performed and sends the log file to the technical support personnel. The technical support personnel then have the information they need to exactly reproduce and analyze the steps performed by the user so as to spot a problem with the software or the user's interaction with it.

Software testing is another field of use. For example, suppose a tester is supposed to evaluate a new UI-based application program for robustness in various scenarios. With a UI recording and playback tool as described herein, the tester quickly generates tests against the UI-based application by recording his steps and generating test code.

End user macros and scripts are yet another field of use. For example, suppose a user routinely performs a procedure with a UI-based application. With a UI recording and playback tool as described herein, the user records the procedure as a script and plays back the script when he needs to perform the procedure.

I. UI Recording and Playback Tool

Figure 2:
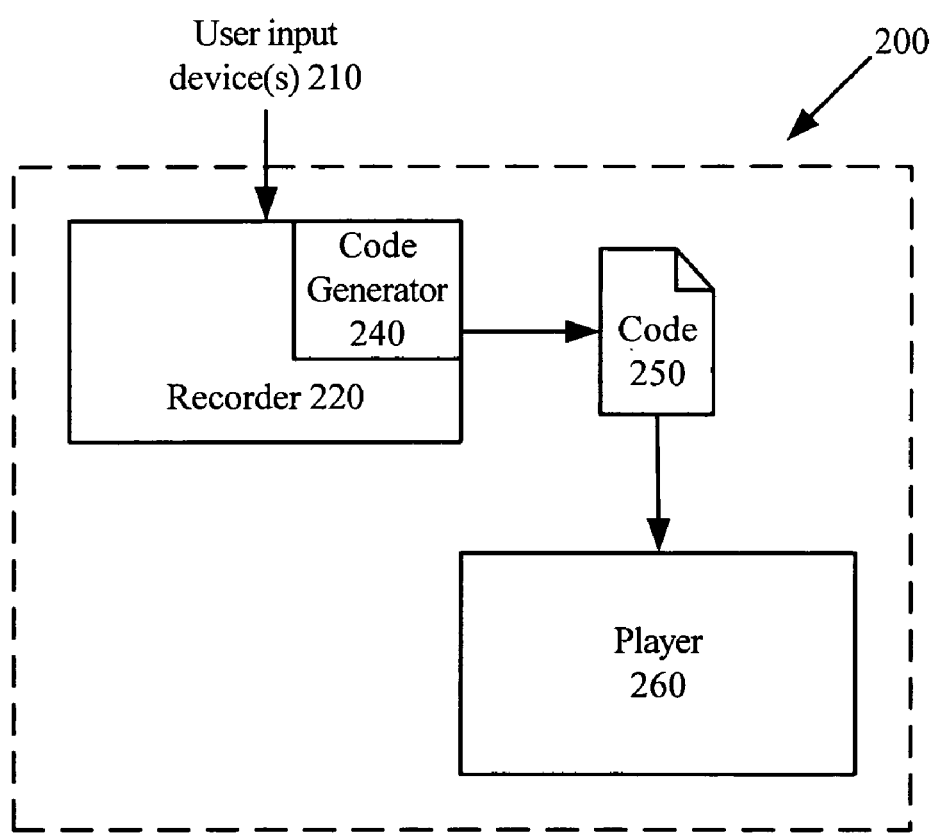
FIG. 2 is a block diagram of a UI recording and playback tool.

The UI recording and playback framework described herein is an extensible framework designed to facilitate the recording and playback of UI activity. FIG. 2 shows an exemplary UI recording and playback tool 200 in which the techniques described herein may be implemented. This tool includes elements of software and/or hardware. As input, the tool 200 receives information from one or more user input devices 210 such as a mouse, a keyboard, a touch pad, touch screen, Braille screen, joystick, microphone, or other similar device. Also it may monitor events from the operating system. The tool 200 receives the input data and produces playback code 250 that, when sent to a playback module 260, replicates the recorded meaningful user activity. The playback code 250 may be output in a variety of programming language formats, including C#, XML, C++, JAVA, or any other similar programming or document-oriented language. The code 250 may be played back on the same computer or, alternatively, on a different computer(s). In some implementations, the code is automatically interpreted by the UI recording and playback tool 200.

FIG. 2 is a block diagram showing various modules of the UI recording and playback tool 200. These modules include modules for recording UI data 220, generating playback code 250, and playing the generated code 260. The relationships shown between modules within the UI recording and playback tool 200 indicate the main flow of information; other relationships are not shown for the sake of simplicity. Depending on implementation, modules of the tool can be added, omitted, split into multiple modules, combined with other modules, and/or replaced with like modules. Alternatively, a tool with different modules and/or other configurations of modules performs one or more of the UI recording and playback techniques described herein.

The recording module 220 records data received from the input device(s) 210 and events raised by the operating system. The input data is derived from actions performed by a user in a GUI environment (e.g., from raw user input actions like mouse movements, mouse clicks, and keystrokes). The recording module 220 uses a pluggable set of filters to aggregate the recorded data. The aggregated data is represented using a set of playback primitives, which abstractly indicate the basic recordable actions performed by a user. One implementation, as illustrated in FIGS. 4A-B, uses 14 kinds of playback primitives to represent recorded data. Alternative implementations may use more or less kinds of primitives.

The playback primitives provide a meaningful and effective way to represent the set of recorded user actions and operating system events. The recording module 220 displays recorded data as playback primitives in a viewer, such as a debugger window, source code browser, or text editor so users may read and browse the data for errors. Once the recorded data has been filtered, it is saved to a file, such as a log file, a text file, or other similar structure for analysis. In alternative implementations, the tool includes additional and/or different modules for presenting or recording the UI data.

After the UI recording and playback tool 200 aggregates the recorded data, the tool 200 generates reliable playback code 250. Using the data received from other modules, the code generating module 240 maps recorded UI information to corresponding instructions in an output programming language. For example, the code generating module 240 converts each instruction from the recorded data into a corresponding instruction in C#. Alternatively, the code generating module 240 converts the recorded data into another programming or document-oriented language.

Figure 3:
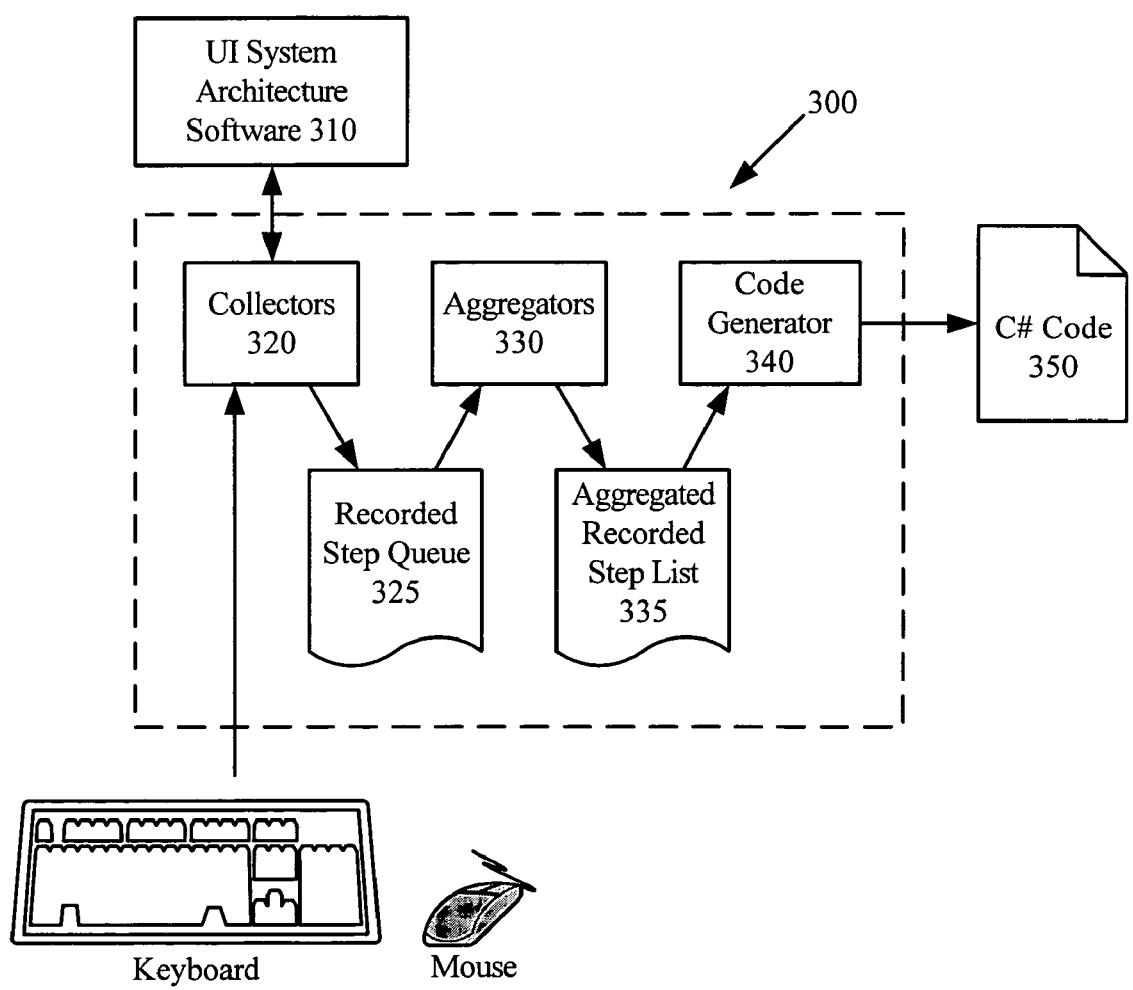
FIG. 3 is a block diagram of a recording tool that generates playback code.

As illustrated in FIGS. 2 and 3, the code generating module 240 is pluggable to the recording module 220, so a developer can reuse a recorder but change the way code is generated by switching to another code generator. In alternative implementations, the code generating module 240 is separate from the recording module 220, or more tightly integrated. The generated playback code 250 may be viewed, saved, edited, modified, added to, deleted from, compiled, or otherwise used prior to playback. In alternative implementations, the tool includes additional and/or different modules for generating playback code from the recorded UI data.

Once the playback code 250 has been generated, it is sent to the playback module 260. The playback module is in essence an engine used by a program to programmatically control a UI-based application. The playback module 260 receives as input the generated playback code 250 from the code generating module 240 and processes the code 250, replicating the recorded UI activity through programmatic interaction with the UI-based application. In one implementation, the playback module 260 compiles the code before running it. In other implementations, the tool includes additional and/or different modules for code playback.

A. The Recorder

A recorder tool records mouse and keyboard input as well as other important input events, such as focus change, selection change, window creation, etc. The recorder tool may be incorporated into the UI recording and playback tool 200 of FIG. 2 (i.e., as the recording module). Or, the recorder tool may be a separate tool.

This recorder tool is extensible and includes a pluggable and adjustable filter designed to facilitate the recording and display of UI activity. FIG. 3 illustrates such a recorder tool 300 (or, alternatively, the recording module 220 of FIG. 2). The recorder tool implements techniques described herein. This tool includes elements of software and/or hardware. As input, the tool 300 receives input from input device(s) 210 and events from the operating system. The tool 300 converts that input into playback code 350.

FIG. 3 shows the various modules of the recorder tool 300. These modules include modules for collecting input data 320, aggregating the collected data 330, and generating code based on the aggregated data 340. Notably, the relationships shown between modules within the recorder tool 300 indicate the main flow of information; other relationships are not shown for the sake of simplicity. Depending on implementation, modules of the tool can be added, omitted, split into multiple modules, combined with other modules, and/or replaced with like modules. Alternatively, a tool with different modules and/or other configurations of modules performs one or more of the recording techniques described herein.

1. The Collector

The collector 320 is an extensible module whose purpose is to collect UI-related data. Basically, this module is responsible for monitoring input device activity 210. In some implementations, the collector 320 monitors input activity in conjunction with UI system architecture software 310 such as UI Automation (UIA) software. GUI technologies like UIA create a framework that allows UI information to be accurately recorded and played back. In other words, UI system architecture software 310 provides a robust framework for acquiring input data; its output is predictable and reliable. In other implementations, the UI system architecture software 310 follows the Microsoft Active Accessibility (MSAA) framework. In still other implementations, a different UI system architecture is used.

In UIA, each UI element is uniquely identifiable by a persistent ID. The collector 320, in UIA implementations, uses the persistent ID to identify UI elements that have been accessed by a user during recording. In addition to the persistent ID, the collector 320 may maintain additional information relating to a user's actions. For example, the collector 320 collects information about the runtime environment, keeps track of running applications, OS version, localization information, default UI language, current UI language, hardware devices and configurations, security modes, and/or other data that may help describe or recreate the proper environment for reliable playback. Similarly, other information relating to recorded mouse/keyboard actions and UIA events may also be recorded. For instance, the time of an action is recorded, the state of keyboard (e.g., CTRL key is pressed), the name, class, and type of a UI element, mouse coordinates, etc. Different implementations record combinations of all these factors and/or additional user actions or events.

The collector 320 identifies the target of user input and records it, along with other meaningful information, as noted above. Basic recordable input may be divided into three categories: mouse actions, keyboard actions, and other events. Mouse actions include input data received from a mouse, e.g., pressing the left button, clicking the right button, moving the mouse, moving a thumb wheel, etc. Recorded keyboard actions include keyboard input such as pressed keys, keys pressed with the CAPS lock or Num-lock on, keys pressed in combination with other keys (e.g., CTRL-S or ALT-F4), etc. Data from other input devices may also be recorded. Finally, other events are recorded; other events include categorized events such as select events, expand events, and value change events.

Select events involve identifying when a user selects or unselects a UI element. When a user selects (by left-clicking with their mouse) one of a number of elements in a list, that event is recorded. Or, if a user unselects an option that event is also recorded. For instance, on some registration web pages, a user is presented with a check box option to "opt into" receiving subscription email from the site's sponsor. If the user checks the box, that select event is recorded. Similarly, if the user unchecks the box, that unselect event is recorded. One of the reasons for tracking this type of event is to provide consistent, reliable playback. For example, suppose an element selected during recording is already selected on playback. Playing back the data as a recorded mouse click, without taking select events into account, would cause the element to be improperly unselected—playback would click the element changing it from a "selected" state to an "unselected" state. This creates inconsistencies between the playback's expected result and the actual result. Hence, the collector 320 records a select event rather than the just the action (e.g., the user clicking on the UI element). By doing so, the tool 300 facilitates consistent and reliable playback.

In addition to select events, the collector 320 records expand events. Expand events include those instances when a list, menu, tree, or other expandable UI element is expanded or collapsed. For example, in versions of Microsoft Outlook, a user clicks on a "+" symbol to expand and show all of their mailbox folders. Alternatively, a user collapses the expanded list of mailbox folders by clicking on a "−" sign. A reason for tracking this type of event is to provide consistent, reliable playback. For example, on playback, an element expanded during recording may already be expanded on playback. As noted above in connection with the select event, under normal circumstances, this may cause playback of a mouse click to fail since the actual result may differ from the expected result. Hence, the collector 320 records an expand event rather than just the mouse click action.

The act of hovering over an expandable UI element may create recording problems for conventional recording systems. For example, suppose a computer application includes a menu bar which has the menu items "File," "Edit," "View," "Format," and "Help" that expand when a user hovers the pointer over them. In this case, a user hovers over "File," causing the "File" menu to expand. At this point, the user is presented with additional "hoverable" options, such as "New" and "Save." When the pointer hovers over "New," a side menu expands, revealing further options such as "Project" or "File." The user selects "Project" from the "New" side menu, launching a new instance of a Project. In this example, a conventional recording system would not record the expand events since no discernible user action (e.g., a mouse click) caused the menus to expand. Playback by the conventional systems would fail since important steps in the process would not be recorded. The collector 320 records this type of expand event.

Additional optimizations may be implemented to prevent the collector 320 from recording extraneous hover-expand events. For example, in the scenario described above, suppose the user hovers the pointer over "New," automatically causing its side menu to expand, and then moves the pointer down the "File" menu and hovers over "Save," causing another side menu to expand. As described above, the collector 320 records both expand events, even though one of the events (New) is extraneous. Recording this extra information typically will not cause playback to fail, but may cause playback to be inefficient. Moreover, the extra data may make reading the recorded input more difficult as troubleshooters and software developers sort through the data to decipher what actions a user input into a UI.

Figure 7A:
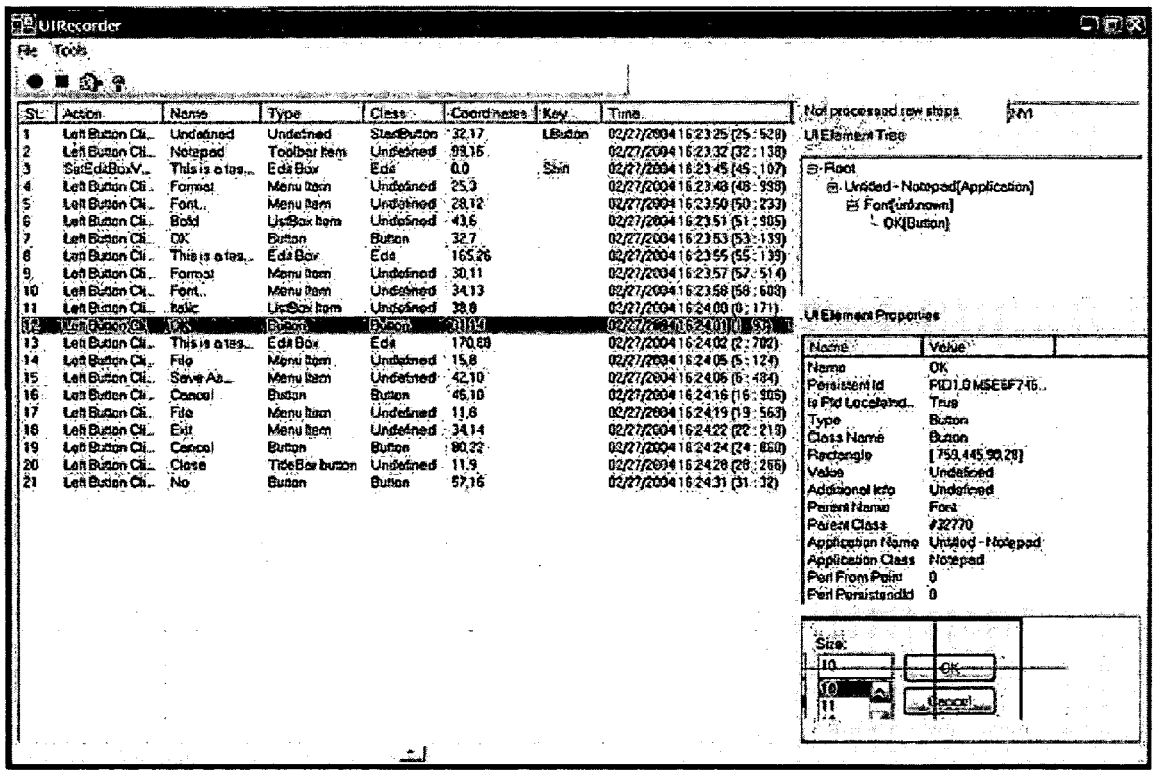
FIGS. 7A-C are screen shots illustrating graphical user interfaces for a UI recording and playback tool.

To avoid these problems, in some implementations, expand events are placed on a stack with an associated hierarchal identifier. The stack is maintained by the collector 320 or by some other module of the recording tool 220. The hierarchal identifier represents a level within the UI hierarchy (e.g., where the expand event element is located in the UI tree). For example, in the scenario above the "File" menu option is assigned a level one hierarchal identifier when it is at the first level within the UI hierarchy. "New" and "Save," are then each assigned a level two identifier, and elements of the side menus are assigned level three identifiers, since they are three levels down in the UI hierarchy. FIG. 7A in the top right-hand window illustrates a sample hierarchal structure.

As each expand event takes place, information about the event is added to the stack, including the hierarchal identifier. Once a non-expand event takes place (e.g., user clicks on "Project"), entries on the stack are popped off and entries with superseded hierarchal level identifiers are filtered out so only the most recent expand event is recorded by the collector 320.

For example, when the user expands "File," an entry (including a hierarchal identifier) is made to the stack. As the user hovers the pointer over "New," another entry, with an appropriate identifier, is added to the stack. If the user hovers over the "Project" option on the "New" side menu, a third entry is added to the stack. Subsequently, the user moves the pointer down the File menu and hovers the pointer over "Save," and then its side menu option "Document;" two new entries are added to the stack. When the user clicks on "Document," the most recent stack entries with unique hierarchal identifiers are retained. In some implementations, as new stack entries are made, previous stack entries with hierarchy identifiers equal to or greater than the current identifier values are deleted or overwritten to limit the size of the stack to the depth of the UI tree. Numerous implementations could be employed to maintain the stack, including use of an array, linked list, or other data structure in memory, on disk, or otherwise accessible to the collector 320 and/or recording tool 300.

The collector 320 also tracks value change events. Value change events are events where the value(s) contained in a UI element change. For example, suppose an edit box initially contains the string "ABC," and a user adds the letters "DEF" to the box. The result of these actions is the edit box containing the six-character string "ABCDEF." Normally, conventional recording systems only record added input, so, on playback, they would only play the string "DEF." Obviously, this may cause inconsistent playback results. To address this concern, on playback, the collector 320 records the final value contained in certain UI elements. There is at least one notable exception.

Certain sensitive forms of data may not be recorded. For example, data entered into a detectable password field is not recorded. On playback, when a password field is encountered, the user is prompted to enter the password rather than having it automatically filled. Alternatively, bogus information such as zeroes or stars could be entered into the password field. In some implementations, UI elements requesting sensitive data are designated by the application provider. Alternatively, the user designates fields containing sensitive data.

Referring again to FIG. 3, once actions and events have been recorded, the collector 320 outputs the recorded data to a collector queue 325. The collector queue 325 includes the combined and processed input data from the input device(s) 210 and UI system architecture software 310 before being parsed and filtered by aggregators 330. The collector queue 325 is of a fixed size (i.e., an array of data) or alternatively, it is of variable size (i.e., a linked list). Depending on implementation, the filtering does not commence until all data has been recorded, or the recorded data in the collector queue 325 is filtered as it is collected, or the collector queue 325 data is filtered on a convenience basis, for example, when the computer has a lighter workload.

2. Aggregators

The aggregator 330 illustrated in FIG. 3 is an extensible tool whose purpose is to eliminate redundant data without loss of essential information. This allows a UI recording and playback tool such as the tool 200 shown in FIG. 2 to avoid generating and playing back code for steps that are not necessary to replicate UI activity. At a high level, the aggregator 330 performs a first set of tasks to screen out certain categories of UI data and capture other categories of UI data, and concurrently or subsequently performs a second set of tasks to streamline or simplify the UI data.

For the first set of tasks, for example, the user defines one or more patterns for UI data that the aggregator 330 should record, and the user defines one or more patterns for UI data that the aggregator 330 should filter out. The user sets any number of entries for different patterns. Each entry includes information such as a description of an action, an identifier of the UI element that playback should interact with for the action, an identifier of the parent UI element, an identifier of the container (e.g., window) that owns the interacting UI element, mouse pointer coordinates relative to the top, left corner of the interacting UI element, and a timestamp. These items typically provide enough information to find a UI element and handle timing problems on playback. One combination of the items is, for example, the action "select item" for a list item with identifier "item" which belongs to a list box with the identifier "list" which is owned by a container "window." One example of a record pattern is: always show a mouse left-button click on a UI element with a button identity. An example of a filter out pattern is: never show a mouse left-button click on a UI element with an edit box identity. The actual parameterization of these patterns depends on implementation.

For the second set of tasks, for example, the user defines one or more patterns for UI data that should be absorbed into/replaced by later UI data, and the user defines one or more patterns for UI data that may be combined with other UI data as specified in the pattern(s). Again, the user sets any number of entries for different patterns, and each entry includes information such as mentioned in the previous paragraph. One example of an absorbing pattern is: if previous and current steps are changes to a value in an edit box, do not record the previous one, but instead just record the current one that has the more recent update. An example of a combining pattern is: if steps are mouse clicks on the menus File, New, and Project, they may be combined into one File->New->Project step. Again, the actual parameterization of these patterns depends on implementation.

A simple aggregation example is as follows. Suppose the following recorded steps are in the collector queue 325, where the numbers in (x, y) format represent pointer coordinates: Mouse Button Down(10,10), Mouse Move(10, 10), Mouse Move(20,20), Mouse Move(30,30), and Mouse Button Up(30,30). The aggregator 330 reduces that set of recorded instructions to something more user-friendly such as Mouse Drag(start(10,10), end(30, 30)).

The aggregator 330 applies an extensible set of rules to the data collected in the collector queue 325 and transfers the aggregated data to an aggregated list 335 of instructions. For example, the aggregator 330 parses an XML rules sheet to identify aggregation rules, then applies those rules to collected data, and finally transfers the aggregated data to the aggregated list 335. In other implementations, other rule application mechanisms are used.

The filters in the aggregator 330 help make recorded UI activity more readable and accessible. The final output of the aggregator 330 can be human-readable output, compiled code, a set of API instructions, or other form of information to control playback. Depending on implementation, the aggregator 330 applies filters to recorded data as it is being recorded, or the aggregator 330 applies the filters to the data once it has been recorded. One exemplary form of output is illustrated in the tracking dialog (main window) of FIG. 7A.

Consider for example, a scenario where a collector 320 records the following UI activity: a user clicks on a File menu, selects "New," types in the name of a project, and presses the "Enter" key. As listed here, there are four main actions and events: clicking on the file menu, selecting "New," typing the name of the project, and pressing the "Enter" key. However, in the process of recording these main actions, a lot of other input data has also been recorded. For example, mouse coordinates as the mouse moves from one location to another, extraneous mouse clicks, and irrelevant keystrokes (including "Backspaces" and "Dels") can be included in the collected data. As user activity increases in size, duration, and complexity, so does the amount of collected data. That data is filtered into meaningful information.

The aggregator 330 filters the data in the collector queue 325 into readable actions and events. Four types of filters are used on the recorded data: removing filters, keeping filters, absorbing filters, and combining filters. Each filter is selectable so a user may decide which filters will be applied to recorded input data, and a user may create user-defined filters to make the recorded input data more readable, more useful, or otherwise more descriptive of meaningful actions. Alternatively, other filters are used, more or fewer filters are used (e.g., by combining or splitting functionality in the four filters or adding new filters), or the filters follow pre-defined templates or patterns that give the user less control in customizing filtering.

The aggregator's 330 removing filter is a filter that removes unnecessary input data from the collector queue 325. For example, a user may decide to filter out clicks on the scroll bar because they are irrelevant to the actual steps necessary for playback, so the user establishes a removing filter rule for screening out such input. Or, the user creates filters to filter out right-clicks, API calls, windows messages, a specific UI element based on its ID, clicks on a menu bar, password information, application data, and/or any number of other actions or events. By removing this type of data from the collector queue 325, the aggregator 330 keeps the relevant input data for display and playback; Basically, it makes the recorded data much easier to read and troubleshoot, and it removes data that incorrectly affects playback performance.

A keeping filter ensures certain types of data are reflected in the recorded output 335. For example, a user may set a keeping filter to keep all the input data related to a specific application, to retain input data related to left-mouse clicks for a specific UI element, to retain input data related to keystrokes, and/or to record data based on any number of other factors. In some implementations, the keeping filter overrides conflicting setting in other filters.

The aggregator 330 also implements an absorbing filter that absorbs strings of data into one instruction. For example, when a user types a hundred characters into a word processor, instead of recording a separate instruction for each keystroke, the absorbing filter aggregates the data into one string. That string is recorded and output as one action in the aggregated list 335. The user may set the maximum or minimum number of entries that may be absorbed into one action.

Finally, the aggregator 330 uses a combining filter to combine multiple user actions of different types into one action. For example, left-clicking a mouse button, repeatedly moving the mouse, and finally releasing the mouse button may be combined into one drag-and-drop step. Basically, dozens or hundreds of recorded actions may be collapsed into a single command.

A user defines the set of filters used by the aggregator 330 to aggregate recorded input data. This may be accomplished by presenting the user with a dialog box or other similar UI element where the user selects and/or defines the filters. The filters are basically patterns or rules that keep, remove, absorb, or combine input in specific ways. For example, a user is presented with a dialog box with four separate tabs, one for each of the four filters discussed above: removing filter, keeping filter, absorbing filter and combining filter. In this example, each tab allows a user to define filters by presenting a template pattern with one, two, or more fields that the user fills in to define the filter pattern.

In UIA implementations, the filters may contain the UI element's persistent ID. For instance, on the removing and keeping filter tabs a combo box allows a user to select from a list, based on persistent ID, which UI elements to remove or keep in the aggregated list 335. Similarly, the absorbing and combining tabs may have a series of combo boxes that allow users to define which UI elements should be absorbed and combined together. The user may use Boolean expressions to define combining and absorbing filters. Other implementations use other techniques for selecting and defining filters.

The following scenario describes how a user, presented with the tabbed dialog box described above, defines an absorbing filter. In this case, the user accesses the absorbing filter tab, which contains a dropdown list box that allows the user to select absorbable UI elements based either on their persistent ID or any set of identifiers such as name, class name, type, etc. Here, the user wants to absorb value changes in a combo box such as one commonly encountered on a registration Web page. For example, suppose a registration page requests a user to enter a billing address and, as part of the billing address, the user is presented with a combo box, listing all of the states in the United States. The act of selecting a state from the combo box's list involves expanding the combo box list, scrolling down the list, and selecting a state from the list. A recording tool recording this process will record the mouse movements required to activate the list, the click to expand the list in the combo box, the changes in value as the user scrolls through the list, the selection of an item in the list, the change in the value of the combo box, etc. To define the absorbing filter that aggregates these steps into one action, from the absorbing tab, the user selects the UI element ID that corresponds to the list of states and the UI element ID of the combo box. The user then proceeds to define additional properties of the filter. For example, the user defines that when the list element is a child of the combo box, only changes in the combo box's value should be recorded. The following table illustrates how a filter rule may look, where the UI data in first column are absorbed into/superseded by the UI data in second column:

TABLE 1

| UI element ID A | UI element ID B |
|---|---|
| action = selected | action = value changed |
| type = list | Type = combo box |
| immediate parent type = combo box | Immediate parent type = DontCare |
| immediate parent name = B.name | Immediate parent name = DontCare |

This means that if the action "value changed" on element B is recorded after the action "selected" on element A, then the line that reflects the action on element A is hidden by the filter.

After a user defines the filter rules, those rules are saved in an XML file or other kind of file that can later be re-loaded (and edited). Thus, a user defines one or more filters parsed and used by the aggregator 330 to aggregate data in the collector queue 325.

Alternative implementations use a filter-defining interface with more or fewer tabs, or use a different type of interface to define filter rules, or use preset filters that attempt to optimally filter data according to some pre-defined criteria.

In summary, the aggregator 330 converts the data in the collector queue 325 into readable data that may be displayed in the aggregated list 335. In some implementations, the aggregator 330 filters the data in the collector queue 325 into primitives.

3. Playback Primitives

Playback primitives are basic recordable playback units. Conceptually, playback primitives are a limited set of descriptors for efficiently representing user actions input into a UI. More concretely, playback primitives are function calls, method calls, or other instructions to control the functionality of a playback component such as the playback module 260 of FIG. 2. The limited set of playback primitives is used to programmatically control a UI-based application through the playback component, which implements the functions, methods, or other functionality for the instructions. Because the playback primitives are somewhat abstract, the primitives are by-and-large application independent, allowing reuse across many different kinds of UI-based applications. Users can easily learn how to work with the relatively small number of playback primitives, and the playback primitives are intuitive, which makes it easier for users to record activities interacting with UI-based applications and generate robust playback code for the activities.

For example, for the sake of comparison, reconsider the example introduced in the Background in which a user clicks on a combo box's dropdown button and scrolls through a list of states to select a state. Prior UI recorders often fail to provide correct playback due to changes in the constituents of the list. With a playback primitive, instead of recording every step and mouse movement, the collective action is recorded as a single playback primitive such as SetComboBoxString ("Washington"). This simplifies UI activity output and provides a mechanism for robust playback even when, on playback, the list of items has changed. Whereas performing the scrolling actions exactly as recorded may not highlight the proper item, the playback primitive above avoids that issue by simply inputting the proper item into the combo box. Moreover, playback primitives typically provide more human readable output.

The number, syntax, and semantics of playback primitives are implementation dependent, but experimentation has indicated that around fourteen primitives provide a solution that balances the need for readably illustrating UI activity, while still providing enough data to drive UI-based applications efficiently and reliably. FIGS. 4A and 4B list the fourteen input-related playback primitives (as well as two additional methods as discussed below). The primitives are implemented so they use mouse and keyboard input to interact with UI elements. Because the playback primitives are based on recognizable standards (mouse and keyboard technology), they are basically technology independent in terms of interaction. Most input devices use mouse and keyboard channels to input data, which means recording mouse and keyboard input allows UI activity to be accurately determined no matter what input device is used. As standards change for input data, other input data channels may be monitored to record data from input devices.

In addition to the fourteen input-related playback primitives, two additional methods are illustrated in FIG. 4B: Verify and Verificationinfo. These two primitive methods support verification of a UI element, e.g., whether it is available and visible for interaction on playback, whether it is selected, etc. For example, on playback, the Verify method may be used to check if a UI element is available and is in the correct state. This can be done for pure testing purposes or for verification of whether the target application is ready for the next step. For example, a target application has a button that becomes "enabled" when a listbox item is available for selection. In this case, the Verify method may repeatedly check to see if an appropriate listbox item is available and notify the proper playback component when the button becomes enabled (e.g., ready to be pushed). While these verification methods are implemented as part of the set of primitives in FIGS. 4A and 4B, alternatively, another application, or other method verifies the availability of UI elements and information related to them.

An additional benefit of having small number of playback primitives is that it is easier to generate unambiguous playback code using them. The primitives as illustrated in FIGS. 4A and 4B are: "EnsureVisible" (ensures a UI element is visible on the screen), "LeftButtonClick," "RightButtonClick," "DoubleClick," "Select," "SetValueAsComboBox" (sets a value selected for a combo box in a drop-down list and other similar UI element in the combo box), "SetValueAsEditBox" (sets a value (e.g., absorbed from multiple entered values) for an edit box), "Check," "Uncheck," "Expand," "Collapse," "SendKeys" (represents input keystrokes), "StartDragging," and "StopDragging." As noted above, these primitives form one exemplary set of descriptors/methods that may be used to represent input data and drive UI-based applications. Alternative implementations combine these primitives into a fewer number of primitives, separate them into a greater number of primitives, or introduce other and/or additional primitives.

FIG. 5 illustrates an alternative set of playback primitives. In this set, the playback primitives used to drive UI-based applications are associated with two types of UI objects, a container element and a UI element belonging to the container. Under this approach, a single user interaction with a UI-based application may be described as follows: Do (Action) on UIelement (UIelement ID) that belongs to container (Container ID).

Action in this context refers to those actions a user can perform interacting with a UI-based application. For example, the list of actions includes those primitive action listed in FIG. 5, e.g., LeftMouseClick, RightMouseClick, LeftDoubleMouseClick, etc. The list also includes primitives for verifying the state, value, etc. for UI elements. (For these primitives, the actual values associated with the type UIelementVerificationInfo depend on what needs to be verified, and may include, for example, name, class, type, or state.) The Container ID is a persistent ID. More generally, the Container ID includes a set of attributes that define the container. For example, the Container ID includes properties such as application name, hierarchal identifier, class type, container name, etc. The container acts as the starting point for a search for a UI element. At the same time, the container may be used to guard against synchronization problems.

The UIelement ID is the persistent ID of the UI element. More generally, the UIelement ID includes a set of attributes that define a UI element. For example, the UIelement ID includes application name, UI element name, and class type of the UI element.

In order to make the function signatures in FIG. 5 more readable, container ID and UIelement ID are used as parameter types. In practice, as noted above, each of these IDs can have multiple items of information associated with it. Container ID and UIelement ID may be implemented as classes so objects of these classes are initialized before they are sent as parameters to a primitive. Or, each attribute may be sent as a separate parameter, or the primitives are implemented in a different way.

FIG. 7A illustrates the sample output of an example aggregated list 335 (with data expressed as playback primitives) displayed in a UI-based recording environment. The displayed output illustrates the aggregated input data used to launch the program Notepad in a Windows environment, type the text "This is a test," edit the text, and exit the program. More specifically, the actions as illustrated in Steps 1-7 are as follows: a user left-clicks on the "Start" button in Windows, left-clicks on a "Notepad" toolbar item (launching the program), the user types the text "This is a test," along the menu bar the user clicks "Format," and selects a new font and bolds it. Finally, the user clicks "OK." Steps 8-12 repeat steps 4-7 except the user italicizes the text instead of bolding it. In steps 13-16, the user clicks on "File," selects "Save As," and then clicks "Cancel." At steps 17-19, the user left-clicks on "File," "Exit," and again "Cancels" the operation. Finally, at step 20, the user clicks on the "X" at the top right-hand corner of the application to close it. The user is prompted to save his work; the user selects "No," and Notepad closes.

At several of the illustrated steps in FIG. 7A, multiple user actions and/or events have been filtered into a readable, meaningful playback primitive. For example, step 1 combines multiple steps (such as mouse movements and a left click) into one simple, readable primitive that plainly shows that the user left-clicked on the "Start" button.

Referring back to FIG. 3, recorded data that has been filtered into playback primitives is converted into playback code 350.

4. Code Generator

The code generator 340 is an extensible component whose purpose is to convert an aggregated recorded step list into programming language code, scripting code, or other commands or instructions for a playback interface or other mechanism to drive UI-based applications. For example, the code generator 340 parses an XML rule sheet that describes how to convert playback primitives into playback code and applies those rules to the data in aggregated list 335, generating playback code (e.g., a set of commands and/or programming instructions) to drive a UI-based application via a playback component. The playback code includes function calls, method calls, or other instructions to control the functionality of a playback component. Basically, there is a relation between the code generator 340 and the playback module 260 from FIG. 2, since the output of one matches the expectations of the other. In some implementations, there is a direct correspondence between the playback primitives in an aggregated data list, the set of commands and/or programming instructions in the playback code, and functions called in an interface of the playback component (which are sometimes themselves be called primitives).

Other information may be used to help convert the playback primitives into playback code 350. FIG. 7A illustrates some of the additional data that may be captured and used. For example, information such as the point coordinates for mouse clicks, string values, container information, persistent ID, timestamp information, and other similar factors is maintained to facilitate generating the playback code.

FIGS. 6A and 6B illustrate C# code for some recorded steps similar to Steps 1-12 illustrated in FIG. 7A. To generate the C# code, the code generator 340 parses a rules table to determine how to convert each playback primitive into its corresponding playback code. For example, the code generator converts the playback primitive associated with step 1 in FIG. 7A to the instructions listed in the piece of code 610 in FIG. 6A. In FIG. 6A, the ScreenElement.FromPersistent ID instruction identifies the "Start" button as the UI element being accessed and the ScreenElement.LeftButtonClick instruction indicates that the "Start" button was left-clicked. Similar conversions may be made for the other playback primitives listed in FIG. 7A. FIGS. 6A and 6B provide an example set of instructions that illustrate C# code to playback steps similar to the first 7 steps illustrated in FIG. 7A. Notably, a different set of conversion rules may instead be applied. In some implementations, the lines of generated code automatically include comments that describe in plain terms what the lines of code do.

Once the code generator 340 has generated the playback code 350, the playback code 350 may be modified, edited, added to, or deleted from. Being able to edit the playback code 350 provides users with a convenient and powerful mechanism for creating macros, generating automatic test cases, automating steps in a program, etc. The generated code may be edited to add conditional expressions, to change variables, to add loops, and other programming instructions to the code. For example, on playback, suppose a piece of playback code alters a system file and requires that a user to be logged on with Administrator rights. So, a conditional expression is added to the playback code, which checks for the appropriate rights before running the piece of code. As another example, suppose software developers want to stress test a program by repeating the same series of instructions over and over again; so, a for loop is added to the playback code, which causes the playback code to be repeated a certain number of times.

In summary, the code generator 340 generates playback code 350 that may be played by a playback component. It provides the ability to edit the playback code, which creates a versatile and robust environment for replicating UI activity.

5. Recording Method

Figure 8:
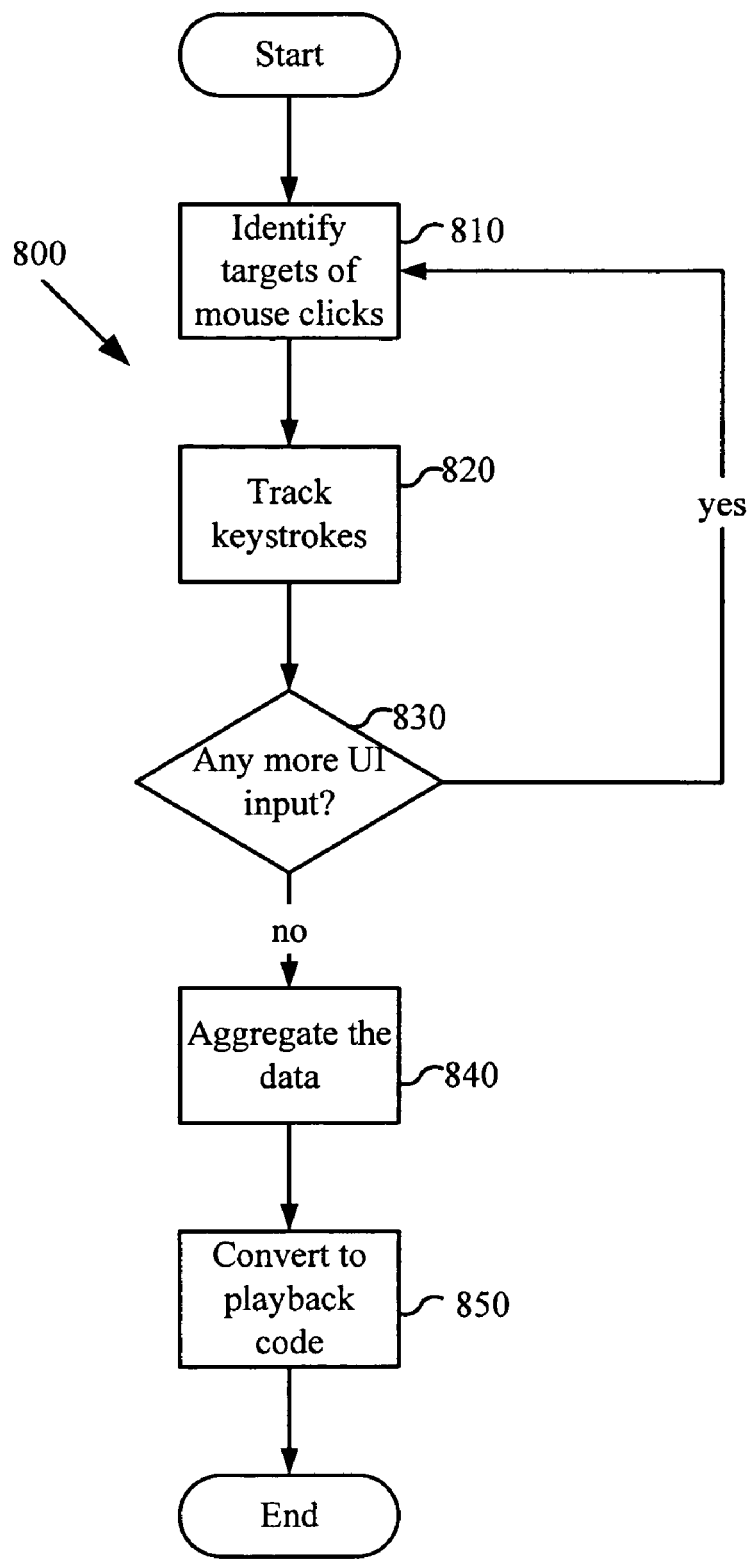
FIG. 8 is a flowchart illustrating a technique for recording UI activity.

FIG. 8 illustrates a technique 800 for converting UI input into playback code. A tool such as the recording tool 300 shown in FIG. 3 performs the technique 800, and the ordering of stages in the technique 800 generally tracks the modules of the tool 300. Alternatively, another tool performs the technique 800.

The recording tool converts UI input into playback code by identifying and recording the targets of input devices 810 such as mice and tracking keystrokes 820. The process of recording UI input continues until a user selectively terminates the recording process or until a designated UI element has been accessed and/or a number of UI elements reached 830.

The tool aggregates the recorded data into meaningful, readable output 840 and converts the aggregated data into playback code 850. For example, using a set of defined filters, the tool aggregates the input data 840 by removing, keeping, combining, and/or absorbing input data, and the filtered data is represented using a limited set of playback primitives. Once UI input data has been recorded and aggregated, the tool generates playback code based on rules associated with converting primitives to code 850.

Alternatively, various stages of the technique 800 are separately or in various combinations performed in conjunction with other stages. For example, while FIG. 8 shows the aggregation 840 and conversion 850 occurring after there is no more UI input, alternatively aggregation 840 is performed concurrently with raw UI input recording.

Figure 7B:
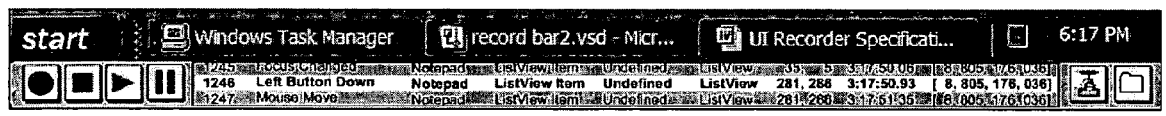
Figure 7C:

As for the user interface for the tool, initially, the tool presents a user with an interface such as the interfaces illustrated in FIGS. 7A-7C. FIG. 7B illustrates a recorder tool located next to the Start menu button, which allows users to record and actively view the recorded input. FIG. 7C shows another implementation of the recording tool pinned to the Taskbar, which allows a user to start and stop the recording process without interrupting other computer activities. The displayed interfaces are operated like a VCR. A user presses a "Record" button (alternatively a "Play" or "Start" button) to begin recording data. To interrupt the recording process, the user presses the "Pause" button. The "Stop" button stops the recording process. Alternatively, different user interfaces are used to record UI activity.

B. Playback

A playback tool replicates UI activity by receiving playback code and driving UI-based applications using the code. The playback tool may be incorporated into the UI recording and playback tool 200 of FIG. 2 (i.e., as the playback module). Or, the playback tool may be a separate tool.

Figure 9:
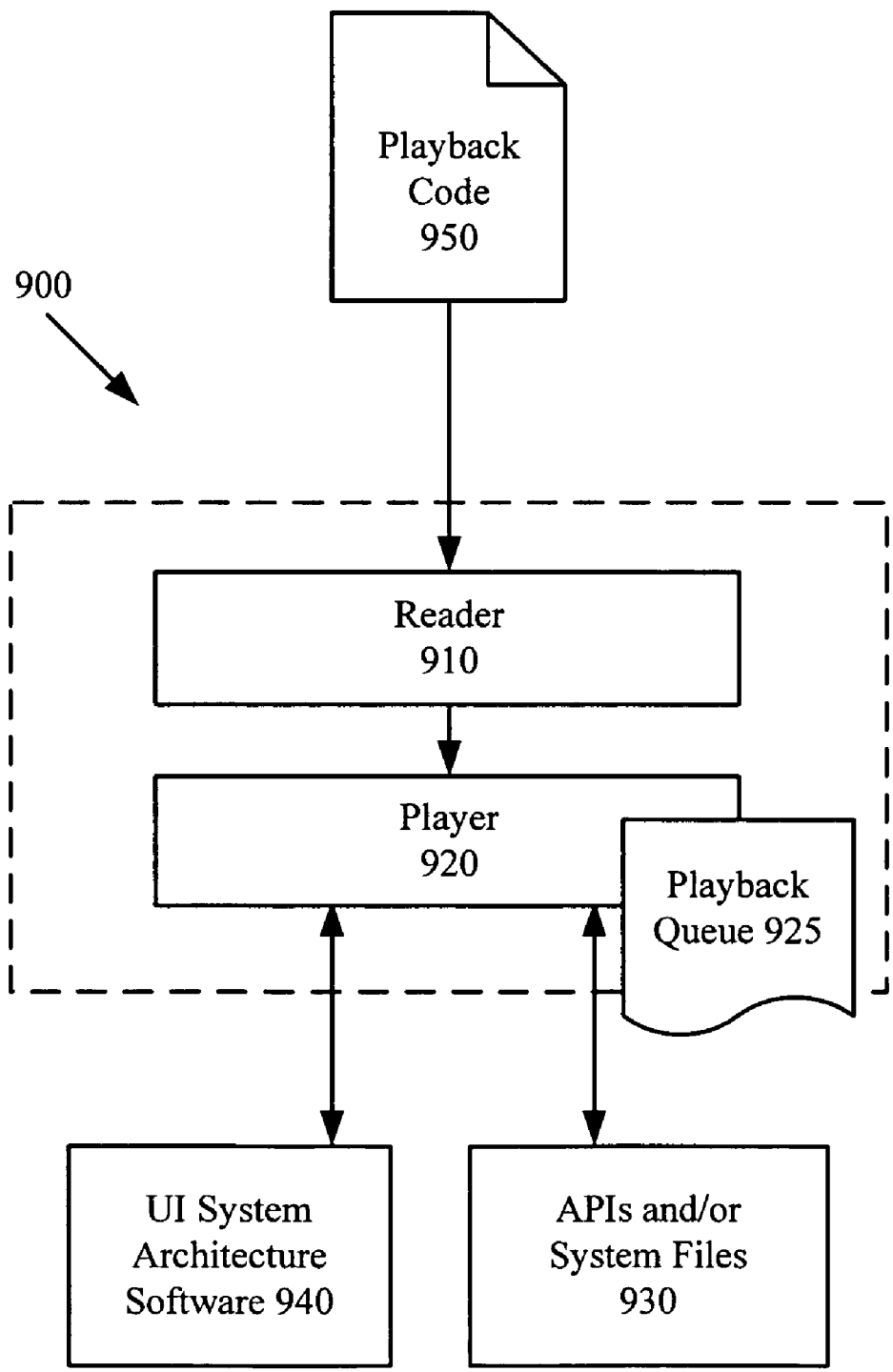
FIG. 9 is a block diagram of a playback tool.

FIG. 9 illustrates a playback tool 900 (or, alternatively, the playback module 260 of FIG. 2). The playback tool implements techniques described herein. As input, the tool 900 receives playback code 950 from a code generator 340 or elsewhere and processes the code.

The playback tool 900 is an extensible tool whose purpose is to read and interpret playback code because, as input, the tool 900 receives playback code 950 from a code generator such as the code generator 340 illustrated in FIG. 3 or elsewhere. In connection with code playback, the tool 900 also interacts with a set of APIs and/or system files 930 (e.g., Win32 APIs) and UI system architecture software 940 (e.g., UI Automation). In some implementations, the playback tool is a software service exposed through an API. Alternatively, the playback tool is a stand-alone application that programmatically controls UI-based applications. The playback tool itself may interact with UI-based programs through the set of APIs 930 or through application-specific mechanisms.

The playback tool may be configured to indicate how playback is to take place. For example, the tool is configured to replicate only mouse clicks, or only keystrokes, or only mouse clicks and keystrokes, or any combination of these actions and events. Moreover, the playback tool may be configured to pause during playback. For example, the user clicks a "Pause" button on the playback tool to pause playback while the user responds to an email. Or, the tool pauses when user input is required to continue processing the playback code. In some implementations, multiple playback scripts are run simultaneously against separate applications. The playback tool provides these and other configurable options.

FIG. 9 shows various modules associated with the playback tool 900. These modules include modules for reading playback code 910 and processing the playback code 920. Other modules, such as the UI system architecture software 940 and APIs and/or system files 930 facilitate playback by the tool 900. The relationships shown between modules within the playback tool 900 indicate the main flow of information; other relationships are not shown for the sake of simplicity. Depending on implementation, modules of the tool can be added, omitted, split into multiple modules, combined with other modules, and/or replaced with like modules. Alternatively, a tool with different modules and/or other configurations of modules performs one or more of the playback techniques described herein.

The reader module 910 of the playback tool 900 receives playback code 950, verifies the code 950, and passes the code 950 to the player module 920. Verifying the code consists of an intelligent verification of the steps or instructions listed in the playback code for an action to be completed. For example, the playback tool receives a file containing playback code and attempts to verify that the file is internally consistent and consistent with the current status of the system. If a UI element listed in the playback code cannot be found, the user is notified, and, in some implementations, the user is asked to manually complete the step. Alternatively, playback is terminated.

The reader module 910 assembles the code 950 into a format executable by the player module 920, and passes the formatted code to the player module 920. In some implementations, the reader module 910 or, alternatively, the player module 920 directly implements the functionality of the primitives called in playback code 950. For example, for playback primitives expressed as function or method calls in the playback code 950, the player module 920 implements the playback primitive functions or methods called to control the UI-based application.

The player module 920 replicates UI activity by implementing the functionality called, scripted, or otherwise controlled by the playback code in a uniform way. Playback code 950 represents a sequence of recorded user actions and events converted into code. In some implementations, the playback code is self-executing and requires no additional input or action by a user or tool. Alternatively, these actions are put into an internal action queue 925, which allows the player module 920 to process each action or event in order.

Processing an action by the player module 920 involves the following steps: (1) get an action from the action queue 925; (2) find/wait for the appropriate UI element or container to open (and verify that the window is visible, enabled and ready for input); (3) wait for the target process to be ready for user input; (4) find the targeted UI element in the window; (5) ensure that this UI element is visible when necessary; (6) if the UI element has a window associated with it, verify that the window is visible, enabled, and ready for input; (7) wait for the target process to be ready for user input; (8) perform the action; and (9) report the result of the action to the playback tool 900 or elsewhere.

If any of steps 2, 4, 5 and 6 fail, the processor module 920 waits a certain period of time before attempting the step again. This allows playback failures to be handled gracefully without crashing the playback tool or any other associated applications.

Performing playback in this way also avoids the synchronization problems of conventional recording systems. Moreover, if a technology other than mouse and keyboard is used for user input and driving a UI-based application, on playback, these steps are discrete and simple enough that only step 8 is changed. For instance, assume that step 8 performs the action of expanding a UI element by calling an Expand( ) function when a mouse cursor passes over the UI element. If a different mechanism is used to control the expansion/collapse of UI elements for an application, the player module 920 simply redirects the Expand( ) call to the appropriate API 930 or other function. Alternatively, the call is simply changed by the player tool 900 or its other support modules 940. Hence, the UI system architecture software 940 and APIs 930 provide the application support for replicating recorded actions.

In summary, the playback tool 900 receives playback code 950 and processes the code 950 in conjunction with its support modules to accurately and reliably replicate recorded UI activity.

1. Playback Method

Figure 10:
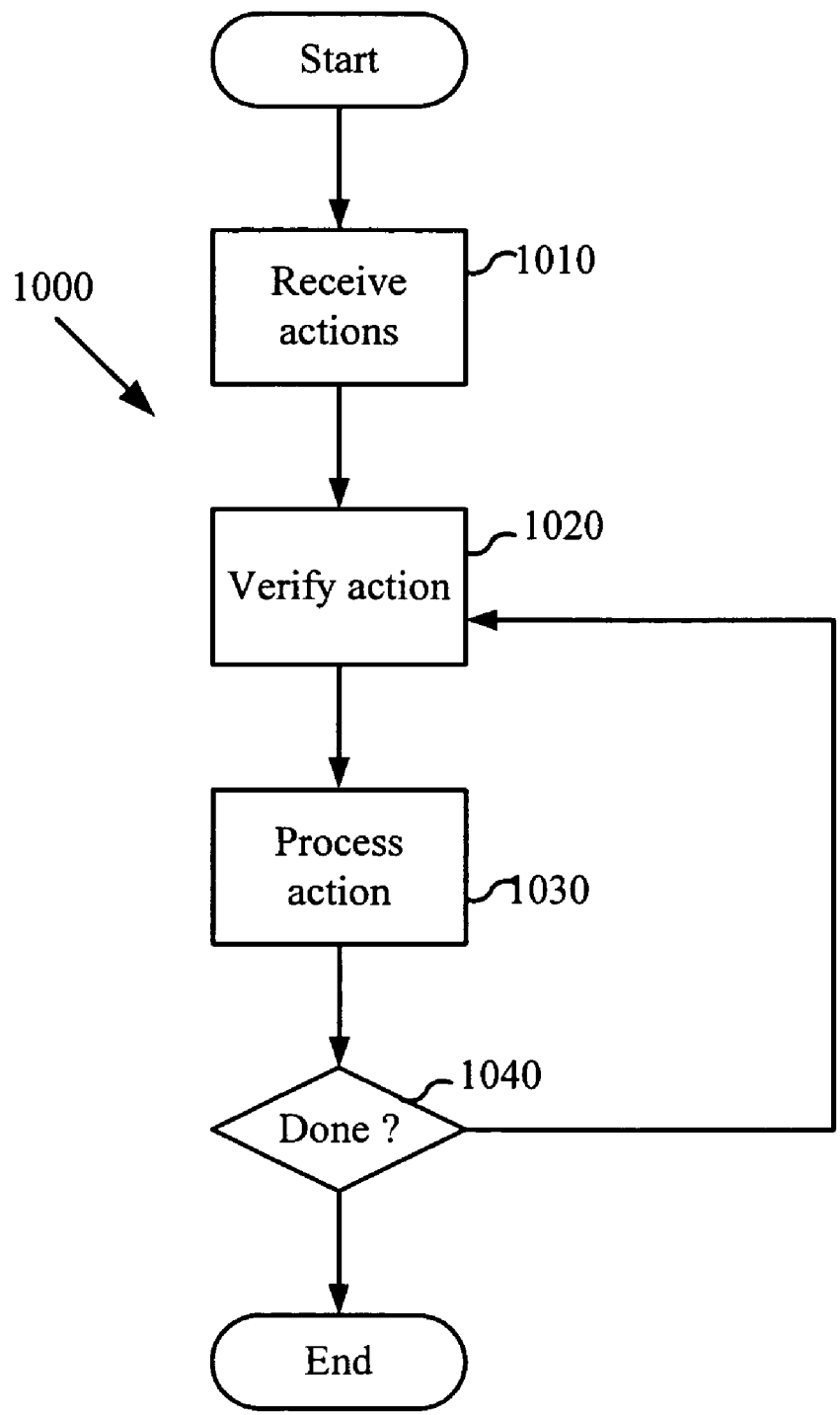
FIG. 10 is a flowchart illustrating a technique for replicating UI activity.

FIG. 10 illustrates a technique 1000 for replicating UI activity. A tool such as the playback tool 900 shown in FIG. 9 performs the technique 1000, and the ordering of stages in the technique 1000 generally tracks the modules of the tool 900. Alternatively, another tool performs the technique 1000.

The tool receives playback code generated from a series of aggregated UI actions 1010, verifies actions in the series 1020, and processes the series of actions 1030. In some implementations, the playback code is placed into a queue and each action in the series is processed in order. Alternatively, user actions are received one at a time from a separate tool. For example, a code generating tool transmits one instruction at a time to the playback tool implementing the technique 1000.

Verifying the user actions 1020 includes such tasks as making sure that a UI element exists, that the persistent IDs are correct, that the application containing the UI element is visible and ready for input, and other such factors. If a user action cannot be verified, the user may be prompted to terminate playback or, alternatively, to enter the information or perform the action.

Processing user actions 1030 involves replicating each user action as smoothly as possible with little or no interference by a user. The tool performing the technique 1000 communicates with UI system architecture software to provide proper instructions to applications. Alternatively, the tool communicates directly with the application(s) through APIs or another mechanism.

Various stages of the technique 1000 may be separately or in various combinations performed in conjunction with other stages.

II. Method for UI Recording and Playback

Figure 11:
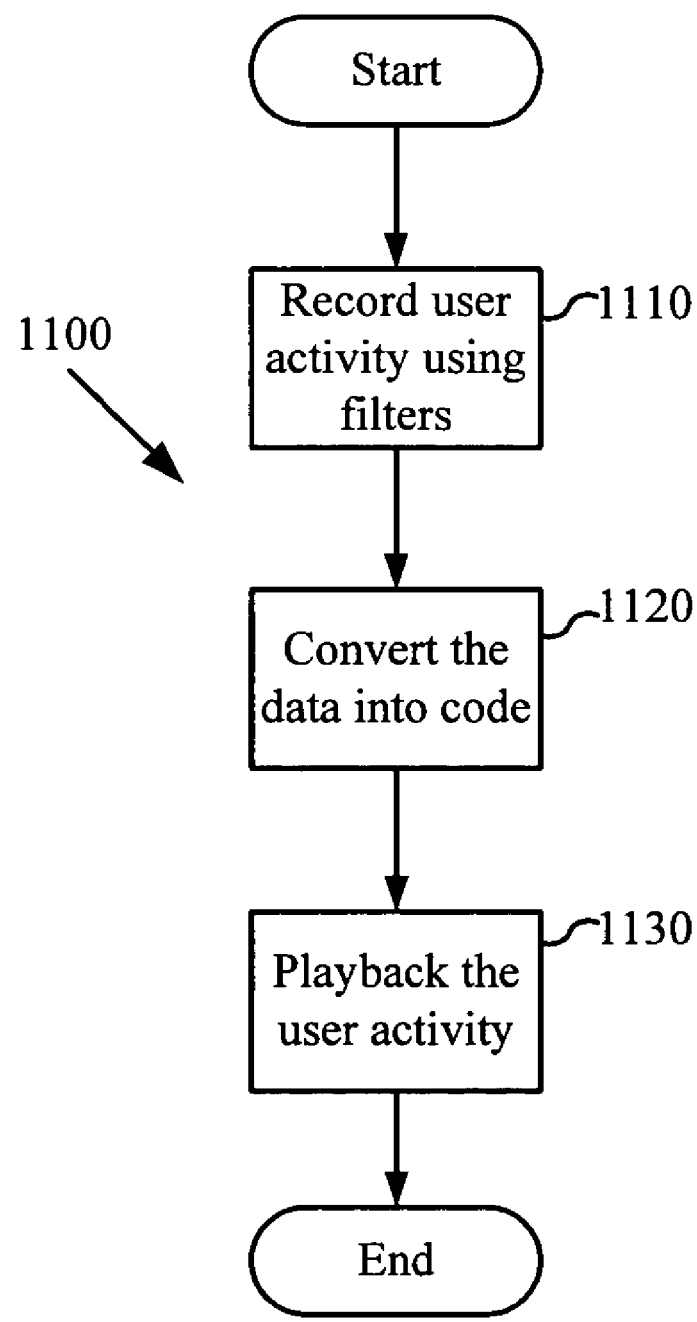
FIG. 11 is a flowchart illustrating a technique for recording and replicating UI activity.

To summarize the preceding discussion with reference to a combined implementation, FIG. 11 illustrates a technique 1100 for converting UI input into playback code. A tool such as the UI recording and playback tool 200 shown in FIG. 2 performs the technique 1100, and the ordering of stages in the technique 1100 generally tracks the modules of the tool 200. Alternatively, another tool performs the technique 1100, or a group of tools performs the technique 1100.

The tool records and aggregates input data by using filters 1100, generates code based on the aggregated data 1120, and replicates the UI activity by playing back the code 1130, driving UI-based applications. In some implementations, the playback stage is performed by a component independent of the tool. Various stages of the technique 1100 are separately or in various combinations performed in conjunction with other stages.

A recorder tool or other recording module performs the first stage 1110 of the technique. Various screen shots illustrating implementations of the recording tool are shown in FIGS. 7A-7C. The recording tool has a "Record" button that allows users to start recording UI activity and a "Stop" button to terminate the recording process. A user clicks the "Record" button, and the recording tool starts collecting input data and displaying it on screen in its aggregated form. Filters may be defined and selected as described in connection with the recording tool in FIG. 3. The filters aggregate recorded data into basic, readable units called playback primitives.

For example, in a Microsoft Windows environment, when a user clicks on the "Start" button and launches the program Notepad, a host of input data is collected. Predefined filters aggregate the data into playback primitives. FIG. 7A show an example set of playback primitives resulting from such UI activity. The set of playback primitives used represent UI activity is limited to a small number, so that the recording tools output is readable. FIGS. 4A and 4B show an example set of playback primitives. Once the user has finished recording his UI activity, he may stop the recording process. FIG. 7A illustrates a "stop" button. Alternative implementations of a recording tool have other and/or additional features.

In the second stage of the technique 1120, a code generator converts the aggregated data into playback code. This can be done automatically, or alternatively, the user clicks a "Generate" code option in a UI recording and playback tool. The process of generating the playback code involves converting primitives into computer language instructions in a programming language, scripting language, document processing language, or other format. For example, each recorded primitive from steps 1-9 in FIG. 7A is converted to a corresponding instruction in C# as illustrated in FIGS. 6A-6B. Alternatively, the code is exported into a different format.

Once the code has been generated, it may be edited. For example, a conditional expression is added to the code in FIGS. 6A-6B so that the code is played back only when an Administrator is logged onto a computer. In some implementations, the code corresponds directly to the playback primitives.

The third stage of the technique 1130 is performed by a playback tool or other playback module. On playback the generated code replicates the same series of commands as were recorded. In some implementations, UI Automation or another UI framework provides support for playing back recorded user actions.

In conclusion, the techniques and tools described create readable code that may be reliably played back to replicate UI activity. This is accomplished through the use of various filters and a limited set of playback primitives.

III. Computing Environment

The above described UI recording and playback tool 200 (FIG. 2) and UI recording and playback techniques can be implemented on any of a variety of computing devices and environments, including computers of various form factors (personal, workstation, server, handheld, laptop, tablet, or other mobile), distributed computing networks, and Web services, as a few general examples. The UI recording and playback tool and techniques can be implemented in hardware circuitry, as well as in software 1280 executing within a computer or other computing environment, such as shown in FIG. 12.

Figure 12:
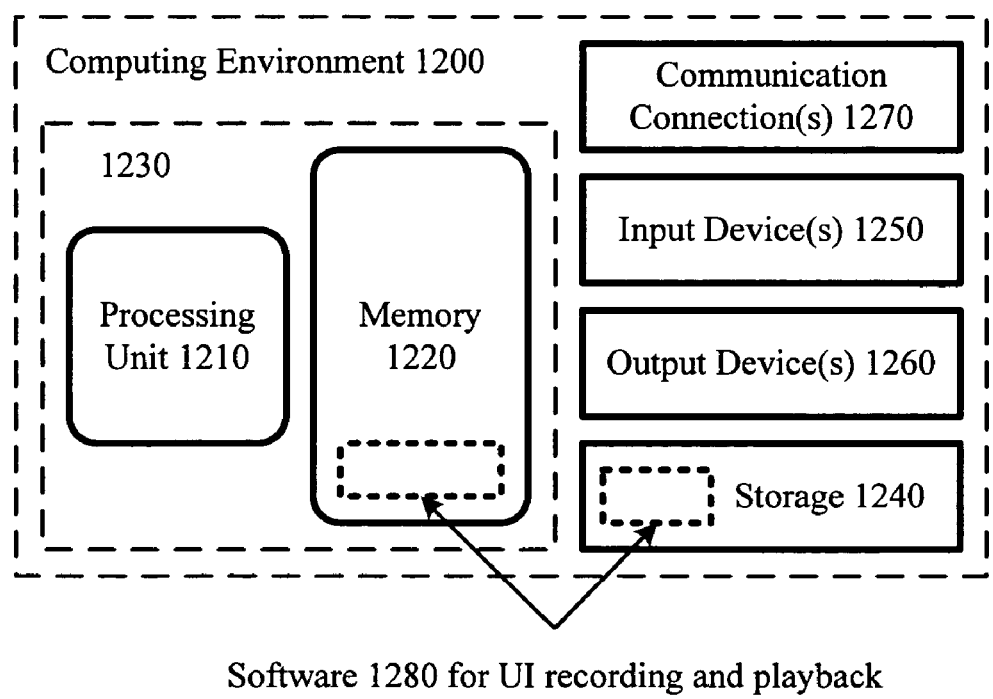
FIG. 12 is a block diagram of a suitable computing environment for implementing the UI recording and playback tool of FIG. 2.

FIG. 12 illustrates a generalized example of a suitable computing environment 1200 in which the described techniques can be implemented. The computing environment 1200 is not intended to suggest any limitation as to scope of use or functionality of the tools and techniques described herein, as they may be implemented in diverse general-purpose or special-purpose computing environments.

With reference to FIG. 12, the computing environment 1200 includes at least one processing unit 1210 and memory 1220. In FIG. 12, this most basic configuration 1230 is included within a dashed line. The processing unit 1210 executes computer-executable instructions and may be a real or a virtual processor. In a multi-processing system, multiple processing units execute computer-executable instructions to increase processing power. The memory 1220 may be volatile memory (e.g., registers, cache, RAM), non-volatile memory (e.g., ROM, EEPROM, flash memory, etc.), or some combination of the two. The memory 1220 stores software 1280 implementing the UI recording and playback tool 200 and techniques.

A computing environment may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and which can be accessed within the computing environment 1200. The storage 1240 stores instructions for the UI recording and playback software 1280.

The input device(s) 1250 (e.g., for devices operating as a control point in the device connectivity architecture) may be a touch input device such as a keyboard, mouse, pen, or trackball, a voice input device, a scanning device, or another device that provides input to the computing environment 1200. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The UI recording and playback software herein can be described in the general context of computer-readable media. Computer-readable media are any available media that can be accessed within a computing environment. By way of example, and not limitation, with the computing environment 1200, computer-readable media include memory 1220, storage 1240, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of my invention may be applied, I claim as my invention all such embodiments as may come within the scope and spirit of the following claims and equivalents thereto.

I claim:

1. A computer-readable storage medium storing computer-executable instructions for causing a computer system programmed thereby to perform a method of selectively recording meaningful user activity in a graphical user interface, the method comprising:

receiving a plurality of actions input for a graphical user interface;

aggregating the plurality of actions using a set of one or more filters into aggregated actions, wherein at least one filter is an absorbing filter, the absorbing filter including a first user-defined rule and a second user-defined rule, the first rule including a reference to the second rule, to define user interface data actions defined by the first rule that are replaced by later user interface data actions defined by the second rule; and converting the aggregated actions into a set of user interface recording/playback primitives, such that playing back the user interface recording/playback primitives replicates the meaningful user activity recorded in the graphical user interface, wherein at least one of the set of user interface recording/playback primitives is a verification method which determines during playback whether a user interface element is available and in a correct state for playback of a next one of the set of user interface recording/playback primitives.

2. The computer-readable storage medium of claim 1 wherein the plurality of actions are received from an input device that is one of a mouse or keyboard.

3. The computer-readable storage medium of claim 1 wherein the set of one or more filters comprises a combining filter that defines multiple separate user interface data actions that can be combined to produce a single user interface data action.

4. The computer-readable storage medium of claim 1 wherein the set of one or more filters further comprises two filters, and wherein the two filters comprise a keeping filter and a removing filter.

5. The computer-readable storage medium of claim 1 wherein each of the set of primitives comprises an EnsureVisible value, a LeftButtonClick value, a RightButtonClick value, a DoubleClick value, a Select value, a SetValueAsComboBox value, a SetValueAsEditBox value, a Check value, an Uncheck value, an Expand value, a Collapse value, a SendKeys value, a StartDragging value, a StopDragging value, a Verify value, or a VerificationInfo value.

6. The computer-readable storage medium of claim 1 wherein at least one of the set of user interface recording/playback primitives is a verification info method that processes user interface element state data collected from at least one of the plurality of actions, and wherein the verification method uses data returned from the verification info method for the determination.

7. The computer-readable storage medium of claim 6 wherein the set of one or more filters is defined in a mark-up language.

8. The computer-readable storage medium of claim 1 wherein the method further comprises:

generating output code based at least in part on the user interface recording/playback primitives; and replicating at least a portion of the plurality of actions input for a graphical user interface by playing back the code.

9. The computer-readable storage medium of claim 8 wherein one of the set of user interface recording/playback primitives records a combo box value as a single recording/playback primitive and wherein replicating at least a portion of the plurality of actions input for a graphical user interface by playing back the code sets the recorded value in the combo box using a single playback primitive.

10. The computer-readable storage medium of claim 1 wherein at least one of the set of user interface recording/ playback primitives converts at least three of the plurality of actions into a single playback primitive.

11. The computer-readable storage medium of claim 1, wherein the verification method determines that the user interface element is available and in a correct state for playback using expected information for the user interface element represented in the set of user interface recording/playback primitives.

12. The computer-readable storage medium of claim 1, wherein one of the filter rules in the user-configurable file includes a Boolean expression.

13. The computer-readable storage medium of claim 1, wherein the determination made by the verification method depends at least in part on a persistent ID associated with the user interface element.

14. A computer-readable storage medium storing computer-executable instructions for causing a computer system programmed thereby to perform a method of generating reliable and readable playback code based on user activity in a graphical user interface, the method comprising:
   receiving and recording a plurality of actions input for a graphical user interface from one or more input devices;
   receiving and recording user element value change events for user elements in the graphical user interface from operating system events on the computer system;
   classifying the plurality of recorded actions and user element value change events into mouse actions, keyboard actions, and other actions, wherein other actions comprise select events, value change events, and expand events, wherein mouse actions are actions received from a mouse, keyboard actions are actions received from a keyboard, select events are actions received when a user selects or unselects a user interface element, and expand events are actions received when an expandable user interface element is expanded or collapsed;
   converting one or more of the classified actions and user element value change events into a set of playback primitives; wherein at least two of the plurality of actions are represented as a single playback primitive, at least one playback primitive includes a user element value change event, and wherein only a most recent expand event in a series of expand events is converted to a playback primitive; and
   generating playback code based on the set of playback primitives.

15. The computer-readable medium of claim 14 wherein generating the playback code comprises converting the set of playback primitives into corresponding programming language instructions.

16. The computer-readable storage medium of claim 14 wherein at least a portion of the plurality of actions comprises a user selecting a user interface element, and wherein one of the playback primitives is a select event primitive which represents the portion of the plurality of actions representing the user selecting the user interface element such that, upon playback of the select event primitive, if the user interface element is already selected, the select event primitive does not unselect the user interface element.

17. The computer-readable storage medium of claim 14 wherein at least a portion of the plurality of actions comprises a user expanding a first menu on mouse hover, and wherein one of the playback primitives is an expand primitive which represents the portion of the plurality of actions representing the expanding a first menu such that, upon playback of the user expand primitive the first menu expands.

18. The computer-readable storage medium of claim 14 wherein converting the plurality of actions and user element value change events into a set of playback primitives further comprises associating an expand event with a time and a hierarchy and only converting the most recent expand event associated with the hierarchy into a playback primitive.

19. The computer-readable storage medium of claim 14, wherein a first action of the plurality of actions is received from a user interface input device of the one or more input devices, wherein a second action is an operating system event, and wherein the single playback primitive represents the first action and the second action.

20. A tool for recording user interface activity, the tool comprising:
   one or more processing units;
   one or more memory units;
   one or more input devices;
   one or more output devices; and
   storage for storing computer-executable instructions for recording user interface activity using:
     a module for collecting data associated with user interface activity;
     a module for screening out certain categories of the data collected by the module for collecting user interface element data to produce filtered user interface element data and for simplifying the filtered user interface element data to produce filtered, simplified data, the module collecting a user interface element identifier, an identifier of the parent, and a container identifier for each user interface element represented;
     a module for converting the filtered, simplified data into a set of user interface playback primitives;
     and
     a module for converting the user interface playback primitives into output code and outputting the output code, the output code the being usable in a module for replicating at least a portion of the user interface activity;
   wherein the module for collecting data associated with user interface activity further comprises a tool within the module for collecting only the last user interface element expand event in a series of user interface element expand events, wherein the module places the series of user interface element expand events on a stack, and wherein collecting a non-expand event causes the module to identify the last user interface element expand event using the stack.

21. The tool of claim 20 wherein the module for converting the filtered, simplified data is extensible.

22. The tool of claim 20 wherein the module for collecting data interacts with a user interface system architecture.

23. The tool of claim 22 wherein the user interface system architecture is UT Automation.

24. A computer-readable storage medium storing computer-executable instructions for causing a computer system programmed thereby to perform a method of reliably replicating user activity in a graphical user interface, the method comprising:
   receiving playback code based on a set of playback primitives, the playback code representing a series of user actions previously input into a first graphical user interface; and
   processing the playback code to play back the series of user actions through a second graphic user interface comprising:
     retrieving a next user action in the series of user actions,
     if a container is associated with the next user action, waiting for the container to open, if a playback primitive in the playback code includes an indication that a user interface element associated with the next user action should be determined to be visible before proceeding, waiting for the user interface element associated with the next user action to be visible, and if the user interface element has an associated window, then waiting for the associated window to be visible, enabled, and ready for input;

if a failure occurs during waiting for the container to open, waiting for the user interface element, or waiting for the associated window, then waiting for a predetermined time to avoid synchronization problems; and performing the next user action.

25. The computer-readable storage medium of claim 24 wherein the receiving playback code comprises:

adding a series of programming instructions to an action queue; and verifying the series of programming instructions to ensure the programming instructions are valid.

26. The computer-readable storage medium of claim 24 wherein the playback code comprises a series of programming instructions that correspond to the series of user actions input into the first graphical user interface, and wherein processing the playback code further comprises:

evaluating each programming instruction in the series of programming instructions; and replicating at least part of one of the user actions based on the programming instruction.

27. The computer-readable storage medium of claim 26 wherein the replicating includes interacting with user interface framework software.

28. The computer readable storage medium of claim 24 further comprising, prior to performing the next user action, waiting for a target process associated with the next user action to be ready for input.

* * * * *

UNITED STATES PATENT AND TRADEMARK OFFICE
CERTIFICATE OF CORRECTION

PATENT NO. : 7,627,821 B2 Page 1 of 1
APPLICATION NO. : 10/869184
DATED : December 1, 2009
INVENTOR(S) : Dmitri A. Klementiev It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Second Day of November, 2010

David J. Kappos
*Director of the United States Patent and Trademark Office*